US012800821B2

(12) United States Patent
Groet et al.

(10) Patent No.: US 12,800,821 B2
(45) Date of Patent: Nov. 17, 2026

(54) WAVEGUIDE WITH PRESCRIPTION LENS AND FABRICATION METHOD THEREOF

(71) Applicant: Meta Platforms Technologies, LLC, Menlo Park, CA (US)

(72) Inventors: Guido Groet, Issaquah, WA (US); Xuanqi Li, Geleen (NL)

(73) Assignee: Meta Platforms Technologies, LLC, Menlo Park, CA (US)

( * ) Notice: Subject to any disclaimer, the term of this patent is extended or adjusted under 35 U.S.C. 154(b) by 441 days.

(21) Appl. No.: 18/457,158

(22) Filed: Aug. 28, 2023

(65) Prior Publication Data

US 2024/0111084 A1 Apr. 4, 2024

Related U.S. Application Data

(60) Provisional application No. 63/411,559, filed on Sep. 29, 2022.

(51) Int. Cl.

*F21V 8/00* (2006.01)
*G02B 27/01* (2006.01)

(52) U.S. Cl.

CPC ........... *G02B 6/0041* (2013.01); *G02B 6/005* (2013.01); *G02B 6/0065* (2013.01); *G02B 27/0172* (2013.01)

(58) Field of Classification Search

CPC .... G02B 6/0041; G02B 6/005; G02B 6/0065; G02B 27/0172

See application file for complete search history.

(56) References Cited

U.S. PATENT DOCUMENTS

| | | | | |
|---|---|---|---|---|
| 10,670,876 B2 * | 6/2020 | Popovich | ............. | G02B 6/0038 |
| 2003/0003295 A1 * | 1/2003 | Dreher | ............. | B29D 11/00009 351/159.02 |
| 2008/0023137 A1 * | 1/2008 | Jiang | ................ | B29D 11/00355 156/701 |
| 2014/0071539 A1 * | 3/2014 | Gao | ................... | G02B 27/0172 359/737 |
| 2016/0377886 A1 * | 12/2016 | Quiroga | ........... | B29D 11/00009 351/159.73 |
| 2020/0257120 A1 * | 8/2020 | Genier | ............... | G02B 27/0172 |
| 2021/0048690 A1 * | 2/2021 | Guillot | .................... | G02C 7/086 |
| 2023/0031417 A1 * | 2/2023 | Saha | ................ | B29D 11/00788 |

* cited by examiner

*Primary Examiner* — Tina Wong

(74) *Attorney, Agent, or Firm* — Greenberg Traurig LLP

(57) ABSTRACT

A device is provided. The device includes a waveguide configured to guide an image light to propagate from a light inputting surface to a light outputting surface. The waveguide includes a substrate having a back surface facing an eye-box region of the device and a front surface opposite to the back surface, a plurality of out-coupling structures disposed at the back surface or at least partially inside the substrate, and a medium layer embedded inside the substrate between the out-coupling structures and the front surface. The medium layer has a refractive index that is lower than the substrate. The device also includes an optical lens printed over the back surface of the substrate.

20 Claims, 18 Drawing Sheets

WAVEGUIDE WITH PRESCRIPTION LENS AND FABRICATION METHOD THEREOF

CROSS REFERENCE TO RELATED APPLICATION

This application claims the benefit of priority to U.S. Provisional Application No. 63/411,559, filed on Sep. 29, 2022. The content of the above-mentioned application is incorporated herein by reference in its entirety.

TECHNICAL FIELD

The present disclosure relates generally to optical devices and fabrication methods and, more specifically, to a waveguide integrated with a prescription lens and a fabrication method thereof.

BACKGROUND

An artificial reality system, such as a head-mounted display ("HMD") or a heads-up display ("HUD") system, generally includes a near-eye display ("NED") system in the form of a headset or a pair of glasses. The NED system is configured to present content to a user via an electronic or optic display within, for example, about 10-20 mm in front of the eyes of a user. The NED system may display virtual objects or combine images of real objects with virtual objects, as in virtual reality ("VR"), augmented reality ("AR"), or mixed reality ("MR") applications. For example, in an AR system, a user may view both images of virtual objects (e.g., computer-generated images ("CGIs")) and the surrounding environment by, for example, seeing through transparent display glasses or lenses (also referred to as an optical see-through AR system. One example of an optical see-through AR system may include a pupil-expansion waveguide (or light guide) display system, in which an image light representing a CGI may be coupled into a waveguide (e.g., a transparent substrate of the waveguide). The image light may propagate within the waveguide via total internal reflection ("TIR"). Out-coupling elements included in or otherwise coupled with the waveguide may couple the image light out of the waveguide at different locations of the waveguide to expand an effective pupil.

SUMMARY OF THE DISCLOSURE

Consistent with an aspect of the present disclosure, a device is provided. The device includes a waveguide configured to guide an image light to propagate from a light inputting surface to a light outputting surface. The waveguide includes a substrate having a back surface facing an eye-box region of the device and a front surface opposite to the back surface, a plurality of out-coupling structures disposed at the back surface or at least partially inside the substrate, and a medium layer embedded inside the substrate between the out-coupling structures and the front surface. The medium layer has a refractive index that is lower than the substrate. The device also includes an optical lens printed over the back surface of the substrate.

Consistent with another aspect of the present disclosure, a method is provided. The method includes providing a waveguide including a substrate having a back surface and a front surface opposite to the back surface, a plurality of out-coupling structures disposed at the back surface or at least partially inside the substrate, and a medium layer embedded inside the substrate between the out-coupling structures and the front surface, the medium layer having a refractive index that is lower than the substrate. The method also includes printing an optical lens over the back surface of the substrate.

Other aspects of the present disclosure can be understood by those skilled in the art in beam of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1:
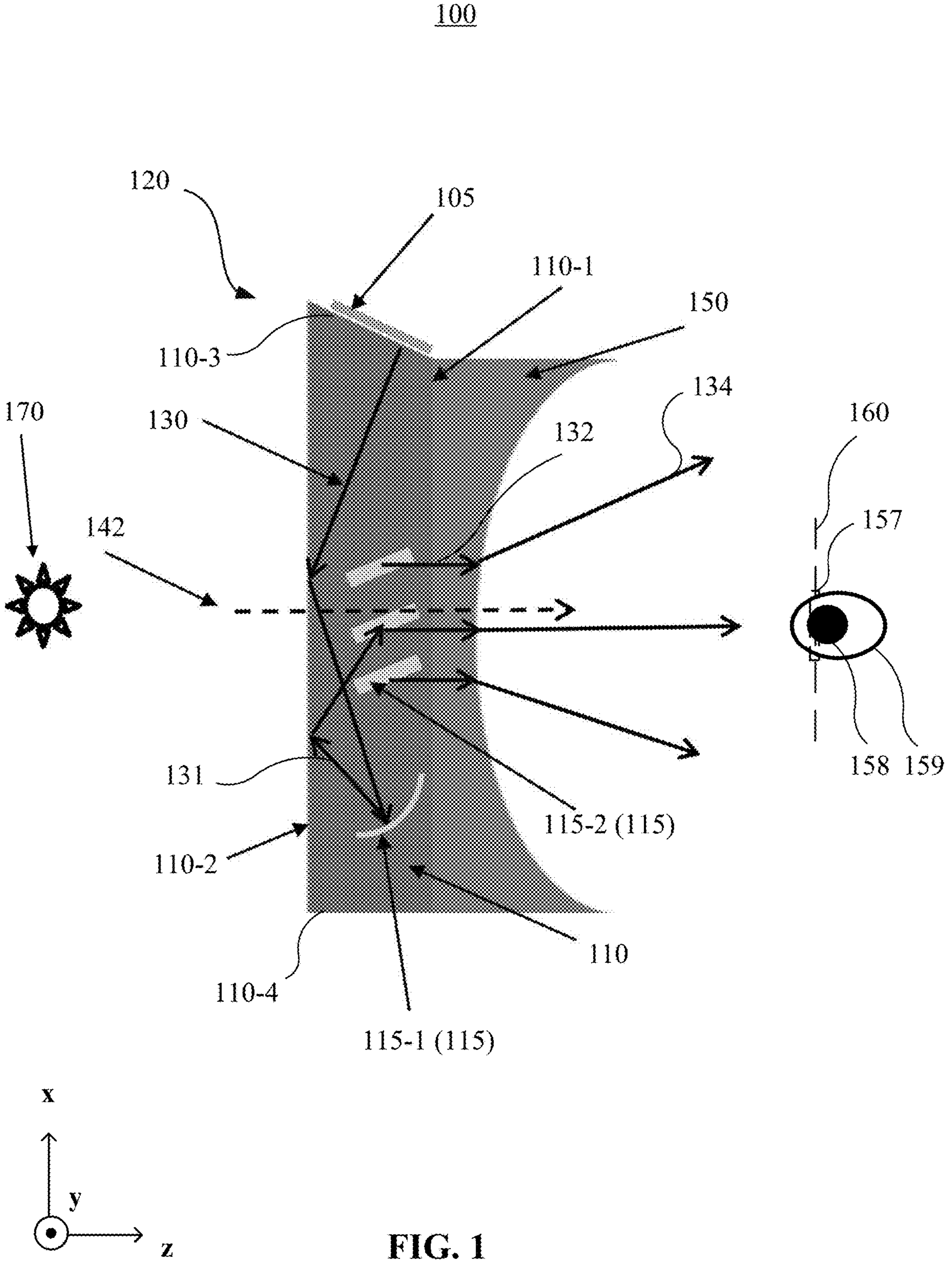
FIG. 1 illustrates a schematic diagram of an optical system including a waveguide integrated with a prescription lens, according to an embodiment of the present disclosure.

Embodiments consistent with the present disclosure will be described with reference to the accompanying drawings, which are merely examples for illustrative purposes and are not intended to limit the scope of the present disclosure.

Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film, " "layer," "coating," and "plate" may be interchangeable.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a major portion, including all, of a light is transmitted, reflected, diffracted, or blocked, etc. The major portion may be a predetermined percentage (greater than 50%) of the entire light, such as 100%, 98%, 90%, 85%, 80%, etc., which may be determined based on specific application needs.

It is a desirable feature that an artificial reality device supports custom prescription lenses for the ametropic population. Additional sought-after features may also include an aesthetic appearance, a light weight, and a high power efficiency. To achieve these features in a balanced manner, integration of a waveguide with a custom ophthalmic (or prescription) lens (or lens function) in a scalable and robust fabrication process is desirable for artificial reality applications. The present disclosure provides an integration of a custom prescription lens (or lens function) with a waveguide in artificial reality devices. The disclosed technical solutions may provide simple manufacturing processes for integrating the custom prescription lens with the waveguide.

FIG. 1 illustrates an x-z sectional view of an optical system 100, according to an embodiment of the present disclosure. As shown in FIG. 1, the optical system 100 may include a light source assembly 105, a waveguide 120, and a prescription (Rx) lens 150 printed (e.g., three-dimensional ("3D") printed) on the waveguide 120. The light source assembly 105 and the waveguide 120 together may form a waveguide display (or waveguide display system), such as a geometric waveguide display including one or more refractive and/or reflective type couplers, a diffractive waveguide display including one or more diffractive type couplers, a mixed waveguide display including one or more refractive and/or reflective type couplers and one or more diffractive type couplers.

In the embodiment shown in FIG. 1, the waveguide 120 may include a substrate 110 and a plurality of micro-structures 115 substantially entirely embedded within the substrate 110. The substrate 110 may be referred to as the main body of the waveguide 120. The substrate 110 may be formed based on a suitable material, such as a plastic material having a refractive index of 1.53, which may provide an increased shock resistance and a reduced coefficient of thermal expansion ("CTE") mismatch. The substrate 110 may be formed via a suitable method, such as injection molding. The substrate 110 may have a first surface or side 110-1 facing an eye-box region 160 of the optical system 100, and a second surface or side 110-2 opposite to the first surface or side 110-1 and facing a real-world environment (e.g., the sun 170). The first surface 110-1 may be referred to as a back surface, and the second surface 110-2 may be referred to as a front surface.

The substrate 110 may also have a third surface or side 110-3, and a fourth surface or side 110-4 opposite to the third surface or side 110-3. The third surface 110-3 and the fourth surface 110-4 may be located between the first surface 110-1 and the second surface 110-2. In the embodiment shown in FIG. 1, the third surface 110-3 may be an inclined surface located at a longitudinal end of the substrate 110 (or the waveguide 120), connecting the first surface 110-1 and the second surface 110-2. In some embodiments, both the first surface 110-1 and the second surface 110-2 of the substrate 110 may be flat surfaces. In some embodiments, the first surface 110-1 may be a curved surface.

In some embodiment, the light source assembly 105 may include a light source (e.g., a display element, not shown) and a collimating lens (not shown). In the embodiment shown in FIG. 1, the light source assembly 105 may be disposed at the third surface 110-3 of the substrate 110, and may output an image light 130 representing a virtual image toward the third surface 110-3. The image light 130 may be a divergent image light including a plurality of bundles of parallel rays having different incidence angles at the third surface 110-3. For discussion purposes, FIG. 1 shows a single ray in a bundle of parallel rays included in the image light 130.

The third surface 110-3 may also be referred to as a light inputting surface where the image light 130 is input into the waveguide 120. The inclination of the third surface 110-3 may be configured to the couple the image light 130 output from the light source assembly 105 into a total internal reflection ("TIR") path inside the substrate 110. In some embodiments, with the inclined surface 110-3, a separate in-coupling element may not be needed. Although the light source assembly 105 is shown as being disposed in direct contact with the third surface 110-3 in FIG. 1, in some embodiments, the light source assembly 105 may be disposed adjacent the third surface 110-3 and spaced apart from the third surface 110-3. In some embodiments, although not shown, a separate in-coupling element may be coupled to the waveguide 120, such as adjacent the third surface 110-3, to couple the image light 130 output from the light source assembly 105 into a TIR path inside the substrate 110.

The micro-structures 115 may be substantially entirely embedded within the substrate 110 between the first surface 110-1 and the second surface 110-2. The micro-structures 115 may include one or more folding or redirecting structures 115-1 configured to redirect the image light 130 to propagate inside the substrate 110, and one or more out-coupling structures 115-2 configured to couple the image light 130 out of the substrate 110. For discussion purposes, the term "micro-structure" as used herein may encompass a structure having micrometer (μm) scale dimensions and/or a structure having millimeter (mm) scale dimensions (e.g., a few millimeters). The micro-structures 115 may include reflectors, mirrors, prisms, or gratings, etc.

For illustrative and discussion purposes, reflectors (also referred to as 115) are used in the embodiment shown in FIG. 1 as examples of micro-structures (out-coupling structures and folding structures). The reflectors 115 may include one or more flat reflectors, and one or more curved reflectors (e.g., concave reflectors) disposed at suitable locations within the substrate 110. For example, as shown in FIG. 1, each folding structure 115-1 may include a curved reflector (also referred to as 115-1), and each folding structure 115-2 may include a flat reflector (also referred to as 115-2). For discussion purposes, FIG. 1 shows one curved reflector 115-1, and three flat reflectors 115-2 arranged in parallel. Any suitable number of curved reflectors and flat reflectors may be included, depending on application needs.

The flat reflectors 115-2 may be located between the curved reflector (e.g., concave reflector) 115-1 and the third surface 110-3. For example, the flat reflectors 115-2 may be substantially entirely embedded within a relatively central portion of the substrate 110, and the curved reflector (e.g., concave reflector) 115-1 may be substantially entirely embedded at a side of the flat reflectors 115-2 in the longitudinal direction of the substrate 110. The reflectors 115 may provide a substantially high reflection for the image light incident onto the reflectors 115, thereby providing a high light efficiency (e.g., 10-15%). The reflectors 115 may also provide a high color uniformity to the image light incident onto the reflectors 115.

It is understood that the curved reflector 115-1 is an example of the folding structure. In some embodiments, other types of folding structure (e.g., prism, grating) may replace the curved reflector 115-1. Although one curved reflector is shown in FIG. 1, in some embodiments, multiple curved reflectors 115-1 may be substantially entirely embedded at multiple locations within the substrate 110. It is understood that the flat reflectors 115-2 are examples of the out-coupling structures that may be substantially entirely embedded within the substrate 110. Other types of out-coupling structures may replace the flat reflectors 115-2.

The waveguide 120 may guide the image light 130 to propagate from the third surface 110-3 toward the first surface 110-1 where the prescription (Rx) lens 150 is disposed. As shown in FIG. 1, the image light 130 may first propagate inside the substrate 110 toward the curved reflector 115-1 via TIR at the second surface 110-2. Thus, the second surface 110-2 may also be referred to as a TIR light reflecting surface. The curved reflector 115-1 may reflect the image light 130 back to the second surface 110-2 as an image light 131, which may be totally internally reflected at the second surface 110-2 toward to the flat reflectors 115-2. The flat reflectors 115-2 may be configured to couple the image light 131 received from the second surface 110-2 out of the substrate 110 as a plurality of output image lights 132 propagating toward the prescription (Rx) lens 150. Thus, the first surface 110-1 of the substrate 110 may also be referred to as a light outputting surface of the waveguide 120.

It is noted that as the TIR of the image lights 130 and 131 may only occur at the second surface (or the TIR light reflecting surface) 110-2, and may not occur at the first surface (or the light outputting surface) 110-1. The second surface 110-2 may be exposed to an external environment (e.g., a real-world environment). The air is used as an example of the external environment. In some embodiments, instead of being exposed to the air, the second surface 110-2 may be exposed to a medium or material layer that has a lower refractive index than the substrate 110, thereby facilitating the TIR of the image lights 130 and 131 at the second surface 110-2. Further, as the TIR of the image lights 130 and 131 may not occur at the first surface (or the light outputting surface) 110-1, an air gap (or a low refractive index material layer) may be omitted between the first surface (or the light outputting surface) 110-1 and the prescription lens 150. In other words, the first surface 110-1 may be in direct contact with the prescription lens 150, or that the prescription lens 150 may be directly printed onto the first surface 110-1 of the substrate 110 through 3D printing. Thus, the undesirable surface reflection at the first surface 110-1 may be reduced, and the image quality may be improved.

The prescription lens 150 may focus (or converge) or defocus (or diverge) each output image light 132 as an image light 134 propagating toward the eye-box region 160. A plurality of exit pupils 157 may be located within the eye-box region 160 of the optical system 100. An exit pupil 157 is a region in space where an eye-pupil 158 of an eye 159 of a user is positioned in the eye-box region 160 to receive the image lights 134 representing content of a virtual image output from the light source assembly 105. The prescription lens 150 may provide a suitable optical power for vision correction, e.g., astigmatism, myopia, and/or hyperopia of the eye 159 of the user. The prescription lens 150 may be 3D printed over the first surface 110-1 of the waveguide 120. In some embodiments, the prescription lens 150 may be in direct contact with the substrate 110. For example, as shown in FIG. 1, the prescription lens 150 may have a flat front surface that is in direct contact with the first surface 110-1 of the substrate 110, and a curved back surface that provides the suitable optical power to the output image lights 132. Although the prescription lens 150 in FIG. 1 is shown as a concave lens, the prescription lens 150 may be a convex lens or any other suitable lens. It is noted that in some embodiments, the prescription lens 150 may be replaced by a non-prescription lens that is 3D printed over the first surface 110-1 of the substrate 110.

In some embodiments, the substrate 110 and the prescription lens 150 may be fabricated based on two different materials having substantially close refractive indices. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 110 and the prescription lens 150 may be fabricated based on the same material, such as a plastic material having a refractive index of 1.53. Accordingly, the undesirable surface reflection at the first surface 110-1 of the substrate 110 may be further reduced, and the image quality perceived by the eye 159 may be further improved. In some embodiments, although not shown, a coating layer configured to facilitate the 3D printing of the prescription lens 150 may be disposed on the first surface 110-1 of the substrate 110 before the prescription lens 150 is 3D printed. For example, the coating layer may enhance the adhesion between the prescription lens 150 and the substrate 110, and/or improve the optical quality of the prescription lens 150, etc. In some embodiments, the substrate 110 and the prescription lens 150 may be fabricated based on different materials, and the coating layer disposed therebetween may also function as a refractive index matching layer configured to match the refractive indices of the substrate 110 and the prescription lens 150. For example, the coating layer may be configured to have a first refractive index substantially matching with the refractive index of the substrate 110 at a first interface, a second refractive index substantially matching with the refractive index of the prescription lens 150 at a second interface, and a gradient transition between the first refractive index and the second refractive index within the coating layer between the first interface and the second interface.

Figure 2A:
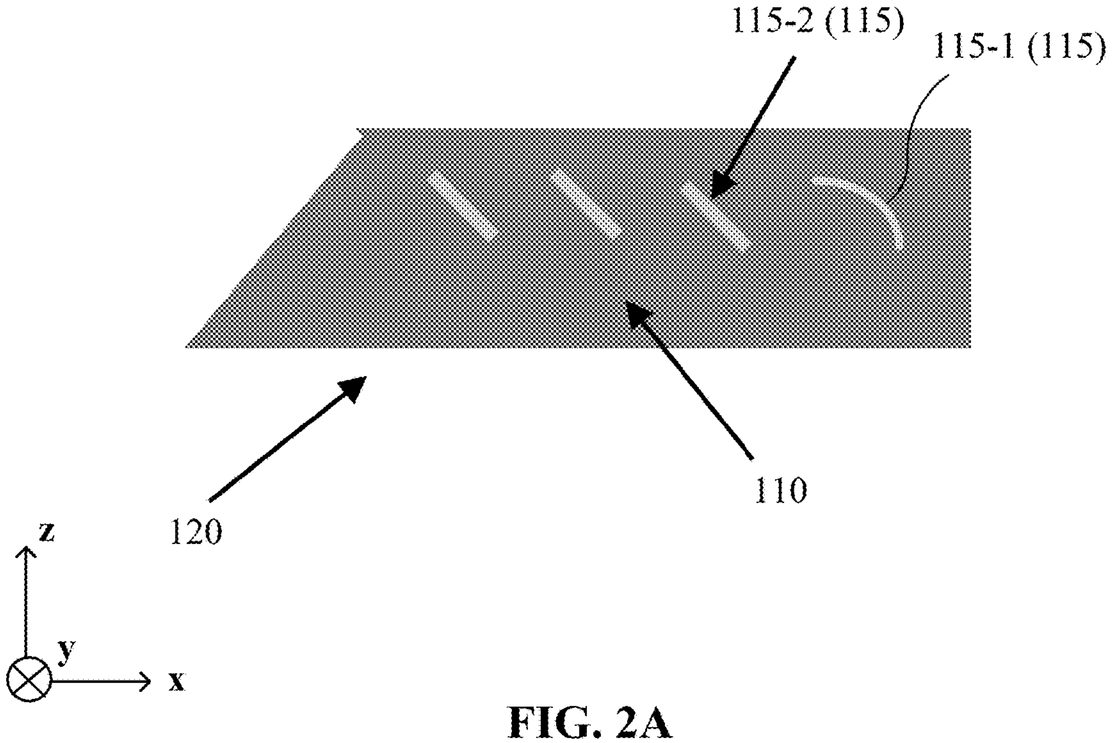
FIGS. 2A-2C illustrate processes for integrating the prescription lens with the waveguide shown in FIG. 1, according to an embodiment of the present disclosure.
Figure 2B:
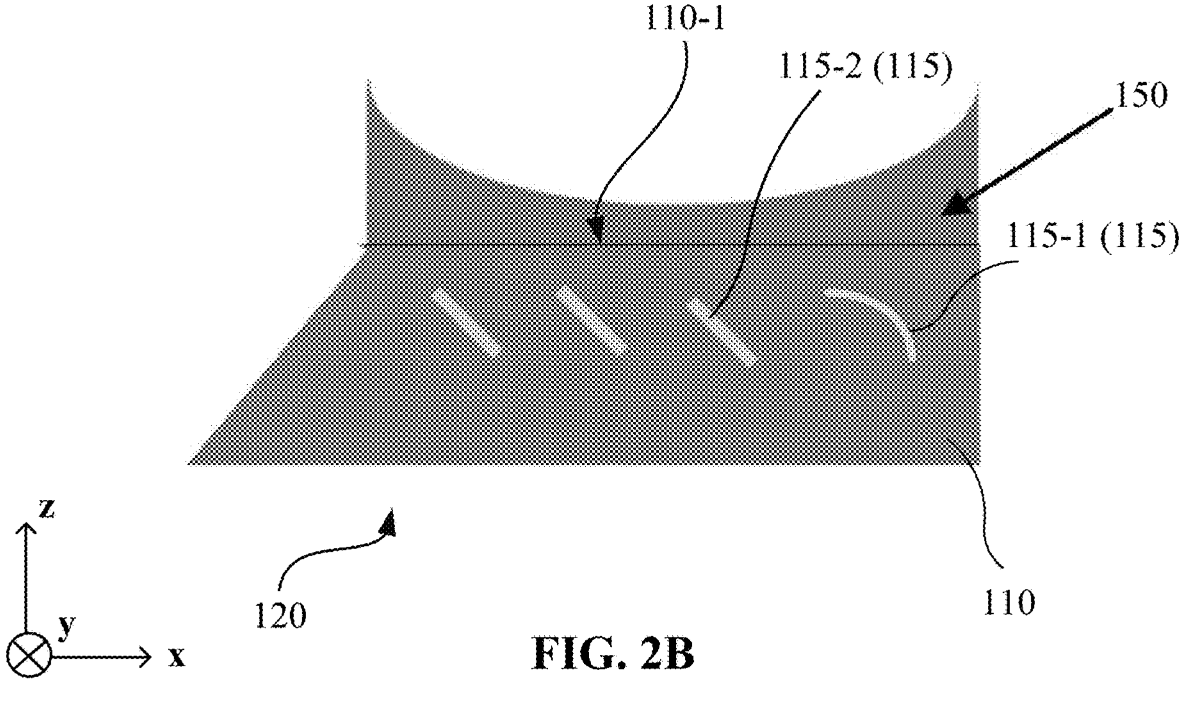

FIGS. 2A and 2B illustrate processes for integrating the prescription lens 105 with the waveguide 120 shown in FIG. 1, according to an embodiment of the present disclosure. As shown in FIG. 2A, the waveguide 120 may be provided. The waveguide 120 may include the substrate 110 and the micro-structures 115 substantially entirely embedded within the substrate 110. As shown in FIG. 2B, after the waveguide 120 is provided, the prescription lens 150 may be 3D printed over the first surface 110-1 of the substrate 110. In some embodiments, the prescription lens 150 may be directly printed (e.g., through 3D printing) over, and may be in direct contact with, the first surface 110-1, without a gap therebetween. As the out-coupling structures (e.g., flat reflectors) 115-2 may be substantially entirely embedded within the substrate 110, the prescription lens 150 may not be in direct contact with the out-coupling structures 115-2.

In some embodiments, the substrate 110 and the prescription lens 150 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 110 and the prescription lens 150 may be fabricated based on the same material, such as a plastic material having a refractive index of 1.53. In some embodiments, although not shown, a coating layer may be formed over the first surface 110-1, and the prescription lens 150 may be 3D printed over the coating layer.

Figure 2C:
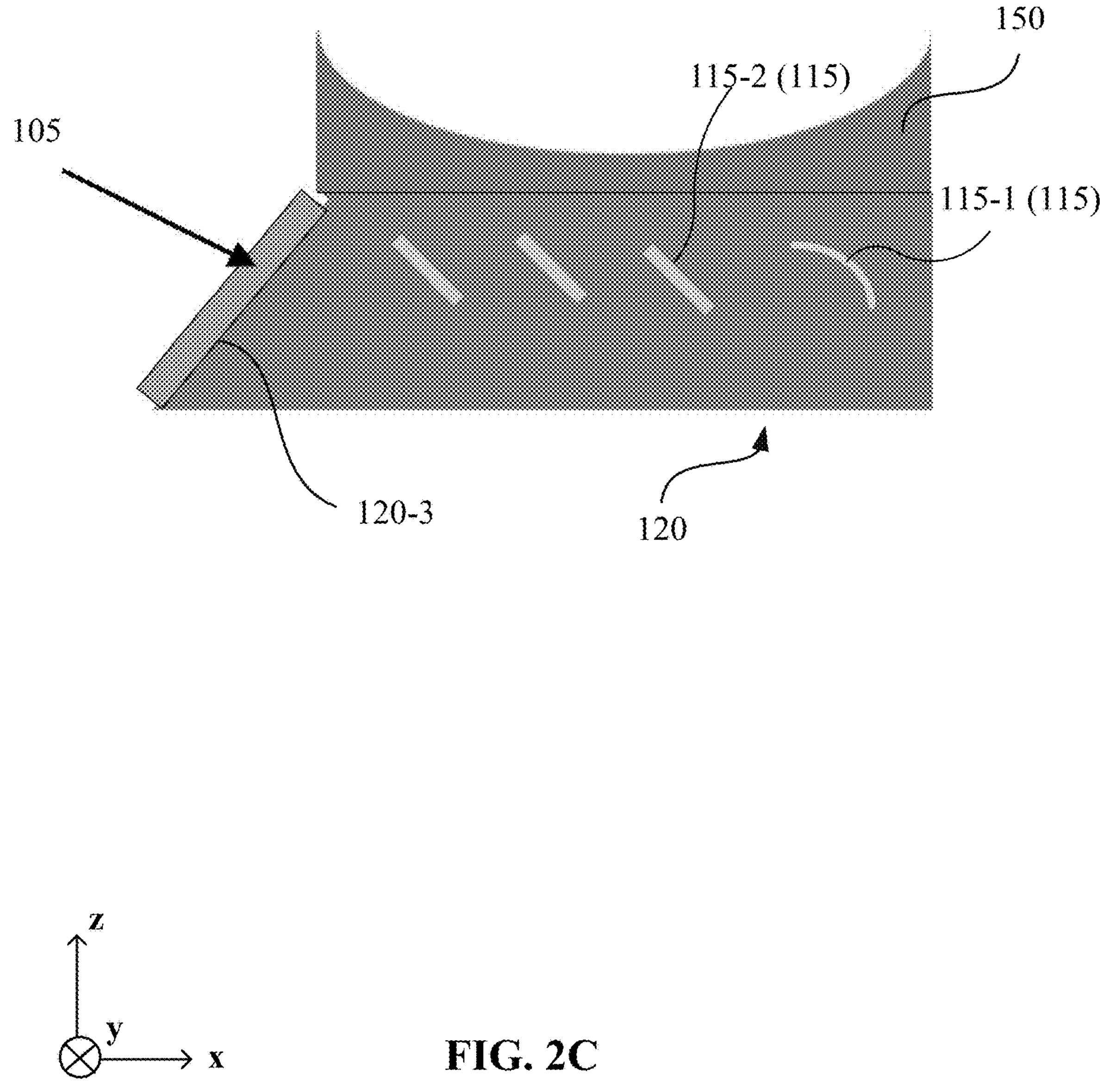

In some embodiments, as shown in FIG. 2C, after the prescription lens 150 is 3D printed over the first surface 110-1 of the substrate 110, the light source assembly 105 may be assembled with the waveguide 120. In some embodiments, the light source assembly 105 may be disposed at the third surface (or the inclined surface) 110-3 of the substrate 110, where the image light output from the light source assembly 105 is coupled into the waveguide 120. Although the light source assembly 105 is shown as being directly disposed on the third surface (or inclined surface) 110-3, in some embodiments, the light source assembly 105 may be disposed at a distance from the third surface (or inclined surface) 110-3. In some embodiments, the light source assembly 105 may be disposed at any other suitable locations relative to the waveguide 120. In some embodiments, although not shown, after the waveguide 120 is provided, the light source assembly 105 may be assembled with the waveguide 120 before the prescription lens 150 is 3D printed over the first surface 110-1 of the substrate 110.

Figure 3:
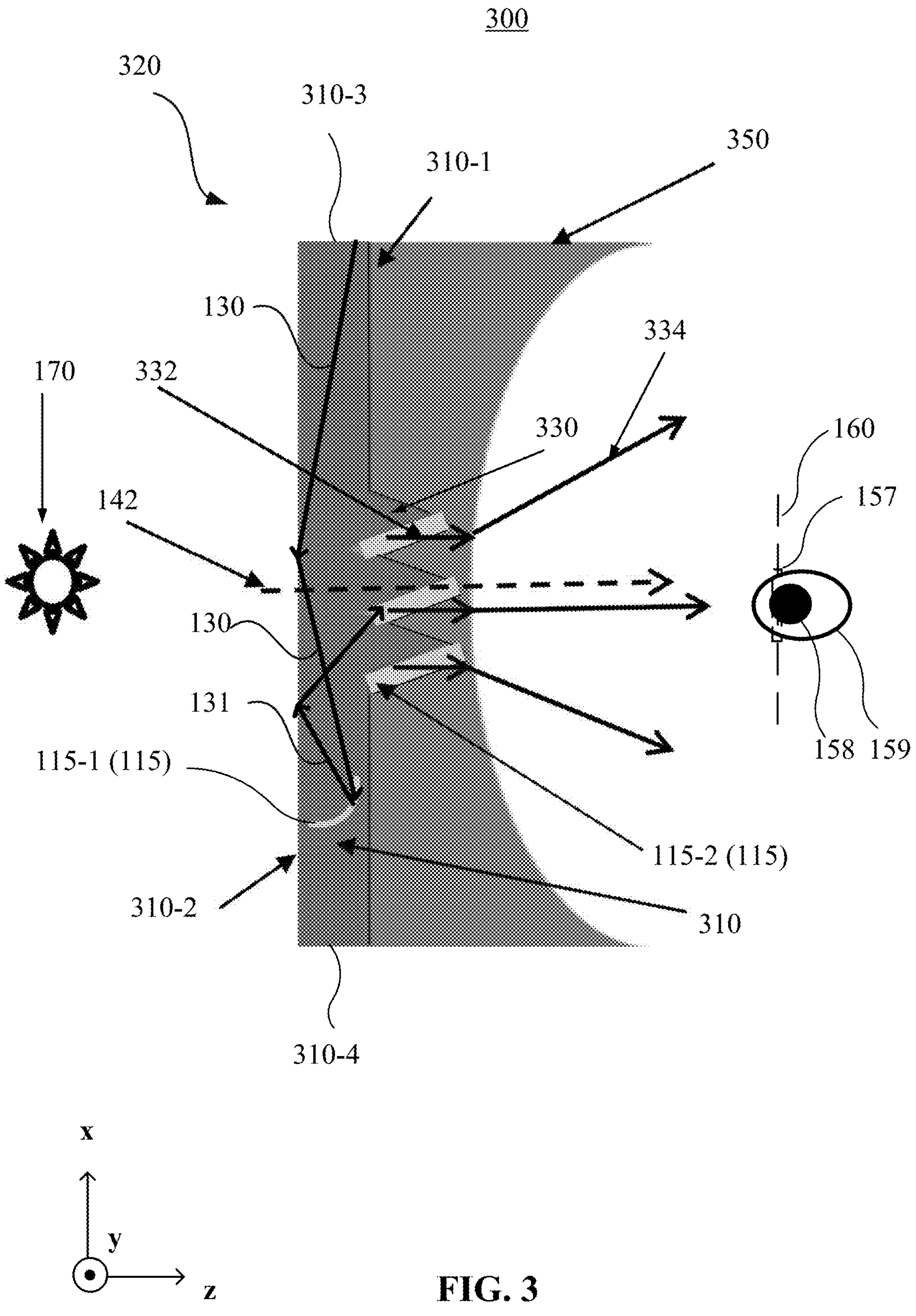
FIG. 3 illustrates a schematic diagram of an optical system including a waveguide integrated with a prescription lens, according to an embodiment of the present disclosure.
Figure 4A:
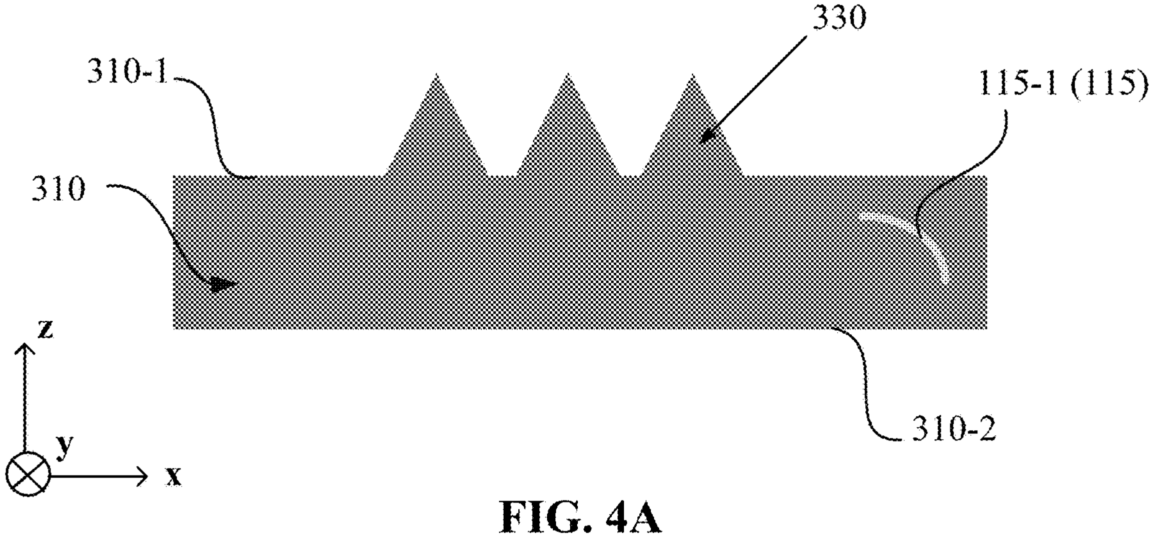
FIGS. 4A-4C illustrate processes for integrating the prescription lens with the waveguide shown in FIG. 3, according to an embodiment of the present disclosure.
Figure 4B:
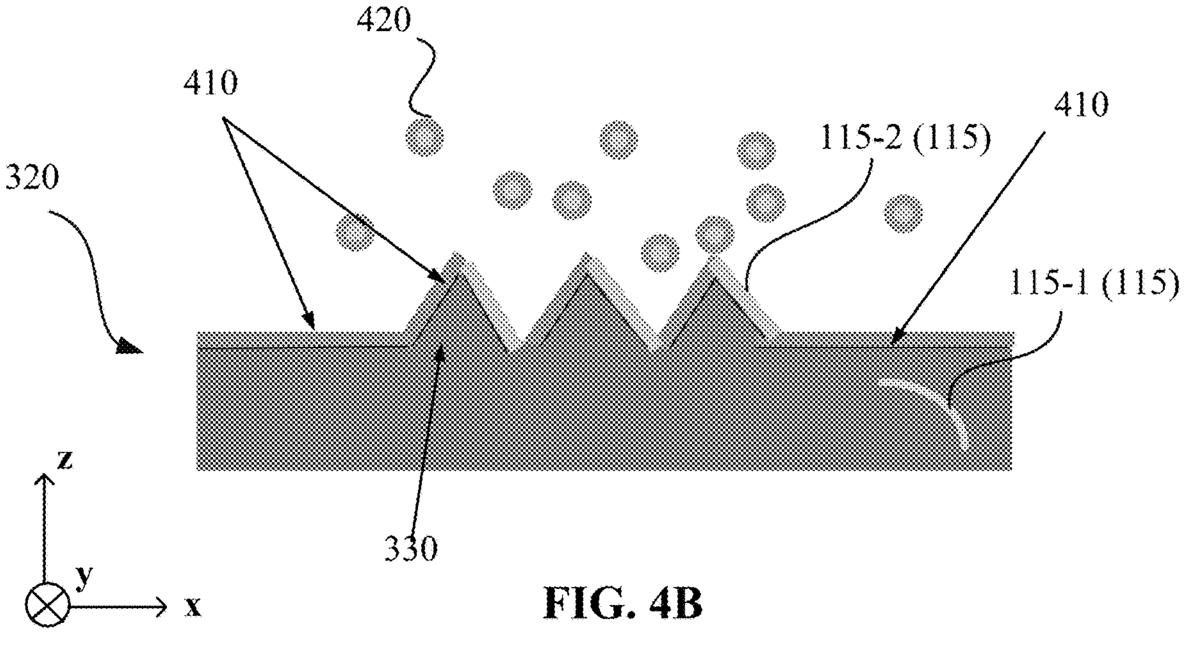
Figure 4C:
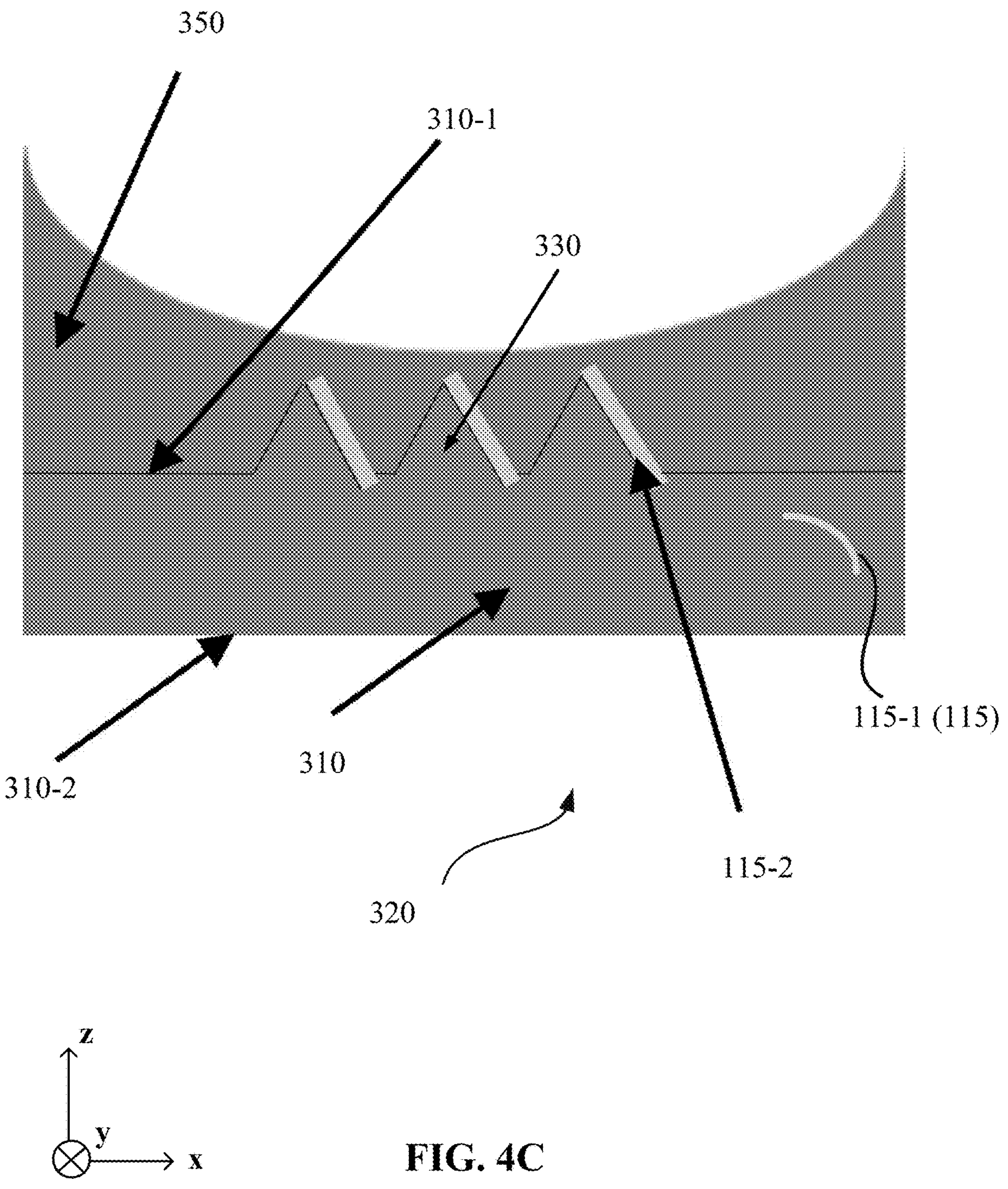

FIG. 3 illustrates an x-z sectional view of an optical system 300 including a waveguide 320 integrated with a prescription lens 350, according to an embodiment of the present disclosure. FIGS. 4A-4C illustrate processes for integrating the prescription lens 350 with the waveguide 320 shown in FIG. 3, according to an embodiment of the present disclosure. The optical system 300 shown in FIG. 3 may include structures or elements that are the same as or similar to those included in the optical system 100 shown in FIG. 1. Descriptions of the same or similar structures or elements included in the embodiments shown in FIG. 3 can refer to the above descriptions, including those rendered in connection with the embodiment shown in FIG. 1.

As shown in FIG. 3, the optical system 300 may include the waveguide 320, and the prescription (Rx) lens 350 printed (e.g., 3D printed) over the waveguide 320. The optical system 300 may also include a light source assembly (not shown, e.g., similar to the light source assembly 105 shown in FIG. 1) coupled with the waveguide 320. The waveguide 320 may include a substrate 310 and a plurality of micro-structures 115. The substrate 310 may be formed based on a suitable material, such as a plastic material having a refractive index of around 1.53. The substrate 310 may have a first surface (or back surface) 310-1 facing the eye-box region 160 of the optical system 300, and a second surface (or front surface) 310-2 opposite to the first surface 310-1. The second surface 310-2 may face the real-world environment (e.g., the sun 170). In some embodiments, the second surface 310-2 of the substrate 310 may be a flat surface. The substance 310 may also have a third surface 310-3, and a fourth surface 310-4 opposite to the third surface 310-3. The third surface 310-3 and the fourth surface 310-4 may be located at the longitudinal direction of the substrate 110, between and connecting the first surface 310-1 and the second surface 310-2.

As shown in FIG. 3 and FIG. 4A, the substrate 310 may include a plurality of supporting structures 330 formed at a predetermined portion of the first surface 310-1 of the substrate 310. The supporting structures 330 may be protrusions from the first surface (or back surface) 310-1 of the substrate 310, and may have a suitable shape. For example, as shown in FIG. 3 and FIG. 4A, the supporting structures 330 may have a saw teeth shape, and each supporting structure 330 may have a triangle cross section. The remaining first surface 310-1 of the substrate 310 where the supporting structures 330 are not formed may be flat. In some embodiments, the supporting structures 330 may be integrally formed as a part of the substrate 310 at the first surface (or back surface) 310-1 of the substrate 310. For example, the supporting structures 330 and rest of the substrate 310 may be made of the same plastic material with a refractive index of, e.g., around 1.53. In some embodiments, the supporting structures 330 may be separately formed, and may be disposed at (e.g., affixed to) the first surface (or back surface) 310-1 of the substrate 310.

The micro-structures 115 may include one or more folding or redirecting structures (e.g., curved reflector) 115-1 substantially entirely embedded inside the substrate 310, and one or more out-coupling structures (e.g., flat reflectors) 115-2 disposed at predetermined surfaces of the supporting structures 330 facing the prescription (Rx) lens 350. The predetermined surfaces of the supporting structures 330 facing the prescription (Rx) lens 350 may be parallel surfaces, and the out-coupling structures (e.g., flat reflectors) 115-2 disposed at predetermined surfaces of the supporting structures 330 facing the prescription (Rx) lens 350 may be arranged in parallel. The supporting structures 330 may provide support for the out-coupling structures 115-2 to be formed thereon. In the waveguide 320 shown in FIG. 3, the out-coupling structures 115-2 disposed at predetermined surfaces of the supporting structures 330 are exposed to the air before the prescription (Rx) lens 350 is 3D printed on the waveguide 320, whereas in the waveguide 120 shown FIG. 1, the out-coupling structures 115-2 are substantially entirely embedded in the substrate 110.

The light source assembly (not shown in FIG. 3) may be disposed at the third surface 310-3 or the fourth surface 310-4 of the substrate 310, and may output the image light 130 toward a light inputting surface of the substrate 310 (or the waveguide 320), similar to the configuration shown in FIG. 1. For discussion purposes, FIG. 3 shows that the third surface 310-3 of the substrate 310 is the light inputting surface of the substrate 310 (or the waveguide 320). The waveguide 320 may guide the image light 130 to propagate from the third surface 310-3 toward the first surface 310-1 where the prescription (Rx) lens 350 is disposed. As shown in FIG. 3, the image light 130 may first propagate inside the substrate 310 toward the curved reflector 115-1 via TIR at the second surface 310-2. Thus, the second surface 310-2 may also be referred to as a TIR light reflecting surface of the waveguide 320 (or the substrate 310). The second surface 310-2 may be exposed to an external environment (e.g., a real-world environment), where the air is used as an example of the external environment. In some embodiments, instead of being exposed to the air, the second surface 310-2 may be exposed to another medium or material layer that has a lower refractive index than the substrate 310 to facilitate the TIR of the image light 130 at the second surface 310-2.

The curved reflector 115-1 may reflect the image light 130 back to the second surface 310-2 as the image light 131, which may be totally internally reflected at the second surface 310-2 toward to the flat reflectors (out-coupling structures) 115-2. The flat reflectors 115-2 may be configured to couple, via reflection, the image light 131 received from the second surface 310-2 out of the substrate 310 as a plurality of output image lights 332 propagating toward the prescription (Rx) lens 350. Thus, the first surface 310-1 of the substrate 310 may also be referred to as a light outputting surface of the of the waveguide 320 (or the substrate 310). The prescription lens 350 may focus (or converge) or defocus (or diverge) each output image light 332 into an image light 334, which may propagate toward the eye-box region 160 of the optical system 300.

In the embodiment shown in FIG. 3, the prescription (Rx) lens 350 may be printed (e.g., 3D printed) on the out-coupling structures (e.g., reflectors) 115-2, on the remaining surfaces of the supporting structures 330 where the out-coupling structures 115-2 are not disposed, and on the remaining first surface (or back surface) 310-1 of the substrate 310 where the supporting structures 330 are not formed. In some embodiments, the prescription (Rx) lens 350 may cover the entire first surface 310-1 of the substrate 310, including the supporting structures 330 and the out-coupling structures 115-2 formed thereon. In some embodiments, the prescription lens 350 and the supporting structures 330 may wrap (and be in direct contact with) the entire out-coupling structures 115-2, such that the out-coupling structures 115-2 are substantially entirely embedded between the supporting structures 330 and the prescription lens 350. In some embodiments, the prescription (Rx) lens 350 shown in FIG. 3 may be in direct contact with the out-coupling structures 115-2, whereas in the embodiment shown in FIG. 1, the prescription (Rx) lens 150 is not in direct contact with the out-coupling structures 115-2. Although the prescription lens 350 in FIG. 3 is shown as being a concave lens, the prescription lens 350 may have a convex lens or any other suitable lens. It is noted that in some embodiments, the prescription lens 350 may be replaced by a non-prescription lens that is 3D printed over the first surface 310-1 of the substrate 310.

It is noted that the TIR of the image lights 130 and 131 may only occur at the second surface (or the light reflecting surface) 310-2 of the substrate 310, and may not occur at the first surface (or the light outputting surface) 310-1 of the substrate 310. Thus, an air gap (or a low refractive index material layer) may be omitted between the substrate 310 and the prescription lens 350 for facilitating the TIR of the image lights 130 and 131 at the first surface (or the light outputting surface) 310-1. The overall undesirable surface reflection at the first surface 310-1 may be reduced, and the image quality may be improved.

In some embodiments, the substrate 310 and the prescription lens 350 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 310 and the prescription lens 350 may be formed based on the same material, such as a plastic material having a refractive index of about 1.53. Accordingly, the undesirable surface reflection at the first surface 310-1 of the substrate 310 may be further reduced, and the image quality perceived by the eye 159 may be further improved.

In some embodiments, although not shown, a coating layer configured to facilitate the 3D printing of the prescription lens 350 may be disposed on the first surface 310-1 of the substrate 310 before the prescription lens 350 is printed onto the first surface 310-1. For example, the coating layer may enhance the adhesion between the prescription lens 350 and the substrate 310, and/or improve the optical quality of the prescription lens 350, etc. In some embodiments, the substrate 310 and the prescription lens 350 may be fabricated based on different materials, and the coating layer disposed therebetween may also function as a refractive index matching layer. For example, the coating layer may be configured to have a first refractive index substantially matching with the refractive index of the substrate 310 at a first interface, a second refractive index substantially matching with the refractive index of the prescription lens 350 at a second interface, and a gradient transition between the first refractive index and the second refractive index within the coating layer between the first interface and the second interface.

FIGS. 4A-4C illustrate processes for integrating the prescription lens 350 with the waveguide 320 shown in FIG. 3, according to an embodiment of the present disclosure. The processes shown in FIGS. 4A-4C may include steps that are the same as or similar to those included in the processes shown in FIGS. 2A-2C. Descriptions of the same or similar steps included in the embodiments shown in FIGS. 4A-4C can refer to the above descriptions, including those rendered in connection with the embodiment shown in FIGS. 2A-2C. As shown in FIG. 4A, the substrate 310 may be provided. The substrate 310 may include the folding or redirecting structure 115-1 substantially entirely embedded inside the substrate 310, and the supporting structures 330 formed at the first surface 310-1 of the substrate 310. The supporting structures 330 may be protrusions from the first surface 310-1 of the substrate 310. In some embodiments, the substrate 310 including the supporting structures 330 may be formed through injection molding.

As shown in FIG. 4B, after the substrate 310 is provided, the out-coupling structures (e.g., reflectors) 115-2 may be formed on predetermined surfaces of the supporting structures 330, via a suitable method, such as metal deposition. For example, a protection material 410 may be first disposed on the remaining first surface 310-1 of the substrate 310 where the supporting structures 330 are not formed, as well as the remaining surfaces of the supporting structures 330 where the out-coupling structures 115-2 are not intended to be formed. The protection material 410 is not disposed at portions of the supporting structures 330 where the out-coupling structures 115-2 are to be formed. The protection material 410 may be resistant to the metal deposition process. Then metal particles 420 may be disposed at the entire first surface 310-1 of the substrate 310. After the metal deposition process, the protection material 410 may be removed via a suitable method. When the protection material 410 is moved, the metal particles 420 deposited on the protection material 410 are also removed, leaving only the metal particles 420 deposited at the surfaces of the supporting structures 330 where the out-coupling structures 115-2 are to be formed. The remaining metal particles 420 form the out-coupling structures 115-2. Thus, the out-coupling structures (e.g., reflectors) 115-2 may be formed on the predetermined surfaces of the supporting structures 330, and may be exposed to the air before the prescription lens 350 is 3D printed onto the substrate 310. The out-coupling structures (e.g., reflectors) 115-2, and the substrate 310 including the redirecting structure 115-1 and the supporting structures 330 together may form the waveguide 320.

As shown in FIG. 4C, after the out-coupling structures (e.g., reflectors) 115-2 are formed on the supporting structures 330, the prescription lens 350 may be printed (e.g., 3D printed) over the first surface 310-1 of the substrate 310 (or the waveguide 320). For example, the prescription lens 350 may be printed (e.g., 3D printed) over the out-coupling structures (e.g., reflectors) 115-2 disposed at the predetermined surfaces of the supporting structures 330, on the remaining surfaces of the supporting structures 330 where the out-coupling structures 115-2 are not formed, and on the remaining first surface (or back surface) 310-1 of the substrate 310 where the supporting structures 330 are not formed. The prescription (Rx) lens 350 may be in direct contact with the out-coupling structures 115-2, and may cover the entire out-coupling structures 115-2.

In some embodiments, the substrate 310 and the prescription lens 350 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 310 and the prescription lens 350 may be fabricated based on the same material, such as a plastic material having a refractive index of about 1.53.

Figure 5:
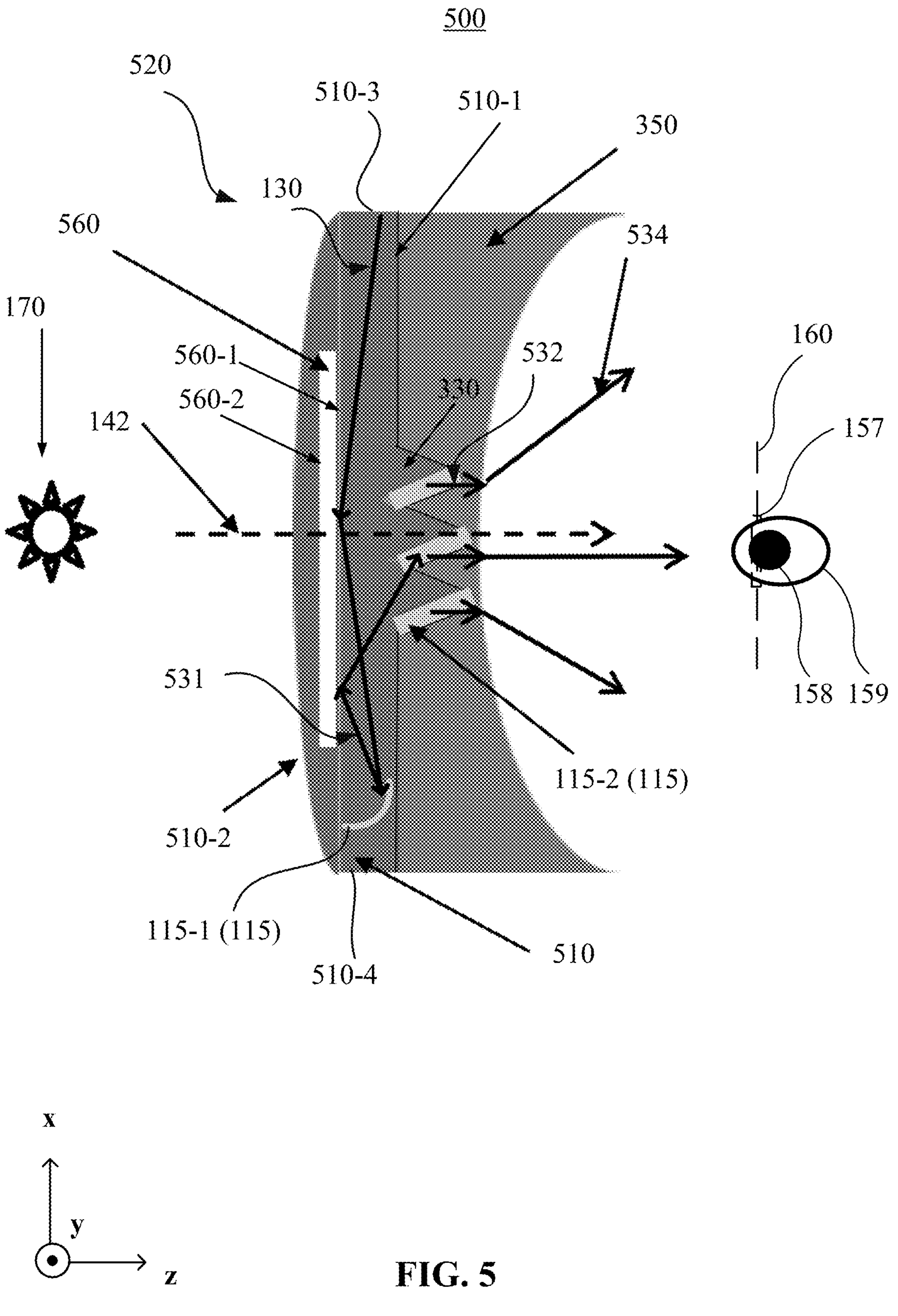
FIG. 5 illustrates a schematic diagram of an optical system including a waveguide integrated with a prescription lens, according to an embodiment of the present disclosure.

FIG. 5 illustrates an x-z sectional view of an optical system 500 including a waveguide 520 integrated with the prescription lens 350, according to an embodiment of the present disclosure. The optical system 500 shown in FIG. 5 may include structures or elements that are the same as or similar to those included in the optical system 100 shown in FIG. 1 or the optical system 300 shown in FIG. 3. Descriptions of the same or similar structures or elements included in the embodiment shown in FIG. 5 can refer to the above descriptions, including those rendered in connection with the embodiments shown in FIG. 1 or FIG. 3.

As shown in FIG. 5, the optical system 500 may include a waveguide 520, and the prescription (Rx) lens 350 that is 3D printed on the waveguide 520. The optical system 500 may also include a light source assembly (not shown, e.g., similar to the light source assembly 105 shown in FIG. 1) coupled with the waveguide 520. The waveguide 520 may include a substrate 510 and a plurality of micro-structures 115. The substrate 510 may be formed based on a suitable material, such as a plastic material having a refractive index of around 1.53. The substrate 510 may have a first surface (or back surface) 510-1 facing the eye-box region 160 of the optical system 500, and a second surface (or front surface) 510-2 opposite to the first surface 510-1. The second surface 510-2 may face the real-world environment (e.g., the sun 170). The substance 510 may also have a third surface 510-3, and a fourth surface 510-4 opposite to the third surface 510-3. The third surface 510-3 and the fourth surface 510-4 may be located along the longitudinal direction of the substrate 510, between and connecting the first surface 510-1 and the second surface 510-2. The micro-structures 115 may include one or more folding or redirecting structures (e.g., curved reflectors) 115-1 substantially entirely embedded inside the substrate 310, the supporting structures 330 formed at a predetermined portion the first surface (or back surface) 510-1 of the substrate 510, and one or more out-coupling structures (e.g., flat reflects) 115-2 disposed at the predetermined surfaces of the supporting structures 530 facing the prescription (Rx) lens 350.

In the embodiment shown in FIG. 5, the second surface (or front surface) 510-2 may be a curved surface, and the TIR of the image light propagating inside the substrate 510 may not occur at the second surface (or front surface) 510-2 and the first surface (or back surface) 510-2. To facilitate the TIR propagation of the image light inside the substrate 510, the waveguide 520 may also include a medium layer 560 formed (or embedded) within the substrate 510. The medium layer 560 may be located between the front curved surface 510-2 and the out-coupling structures (e.g., reflectors) 115-2. The medium layer 560 may have a refractive index that is smaller than the refractive index of the substrate 510. For example, the medium layer 560 may be an air gap (e.g., a cavity filled with air) or a solid medium layer having a refractive index that is smaller than the refractive index of the substrate 510. In some embodiments, the medium layer 560 have a rectangular cross-sectional shape with a first side 560-1 facing the eye-box region 160 and a second side 560-2 opposite to the first side 560-1. The first side 560-1 may be flat, and the second side 560-2 may be flat or curved. The first side (e.g., flat side) 560-1 of the medium layer 560 may function as a light reflecting interface where the TIR of the image light propagating inside the substrate 510 occurs.

The waveguide 520 may guide the image light 130 to propagate from a light inputting surface (e.g., the third surface 510-3) toward a light outputting surface (e.g., the first surface 510-1) where the prescription (Rx) lens 350 is disposed. As shown in FIG. 5, the image light 130 may first propagate inside the substrate 510 toward the curved reflector 115-1 via TIR at the first side (e.g., flat side) 560-1 of the medium layer 560. The curved reflector 115-1 may reflect the image light 130 back to the first side (e.g., flat side) 560-1 of the medium layer 560 as an image light 531. The image light 531 may be totally internally reflected at the first side (e.g., flat side) 560-1 of the medium layer 560 toward to the flat reflectors 115-2. The flat reflectors 115-2 may be configured to couple, via reflection, the image light 531 out of the substrate 510 as a plurality of output image lights 532 propagating toward the prescription (Rx) lens 350. The prescription lens 350 may be 3D printed over the first surface 550-1 of the substrate 550. The prescription lens 350 may focus (or converge) or defocus (or diverge) each output image light 532 into an image light 534, which may propagate toward the eye-box region 160 of the optical system 500.

As the TIR of the image lights 130 and 531 only occurs at the first side (e.g., flat side) 560-1 of the medium layer 560, and does not occur at the first surface (or the light outputting surface) 510-1, an air gap (or a low refractive index material layer) may not be needed between the substrate 510 and the prescription lens 350. The overall undesirable surface reflection at the first surface 510-1 may be reduced, and the image quality may be improved.

In some embodiments, the substrate 510 and the prescription lens 350 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 510 and the prescription lens 350 may be fabricated based on a same material (e.g., a plastic material having a refractive index of about 1.53). Accordingly, the undesirable surface reflection at the first surface 110-1 of the substrate 110 may be further reduced, and the image quality perceived by the eye 159 may be further improved.

Figure 6A:
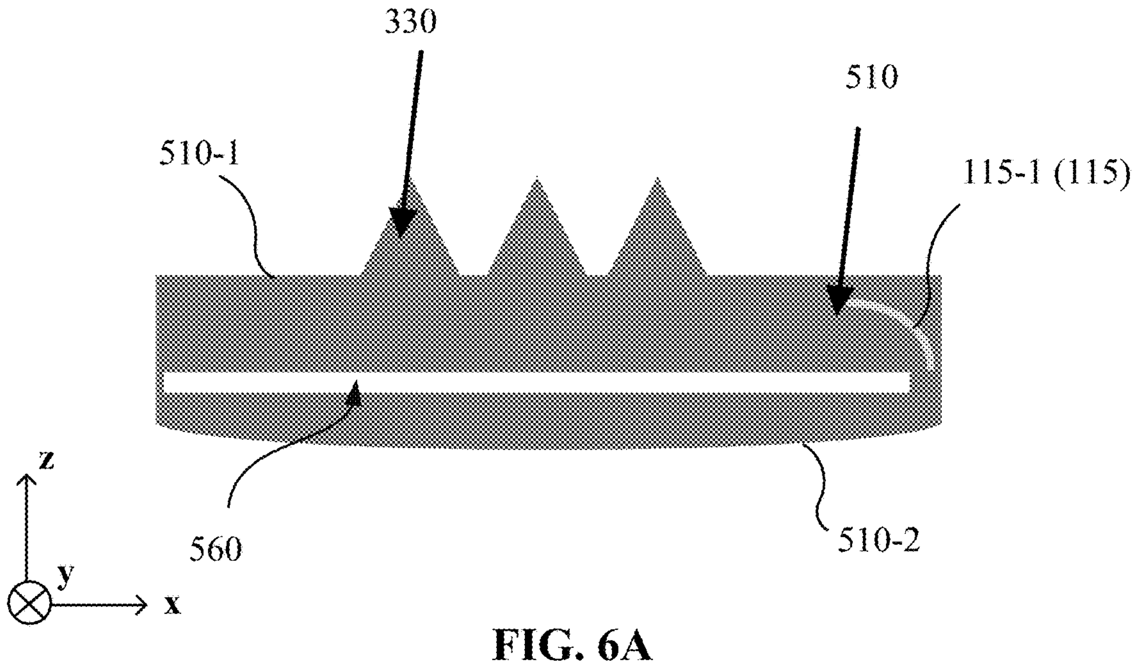
FIGS. 6A-6C illustrate processes for integrating the prescription lens with the waveguide shown in FIG. 5, according to an embodiment of the present disclosure.
Figure 6B:
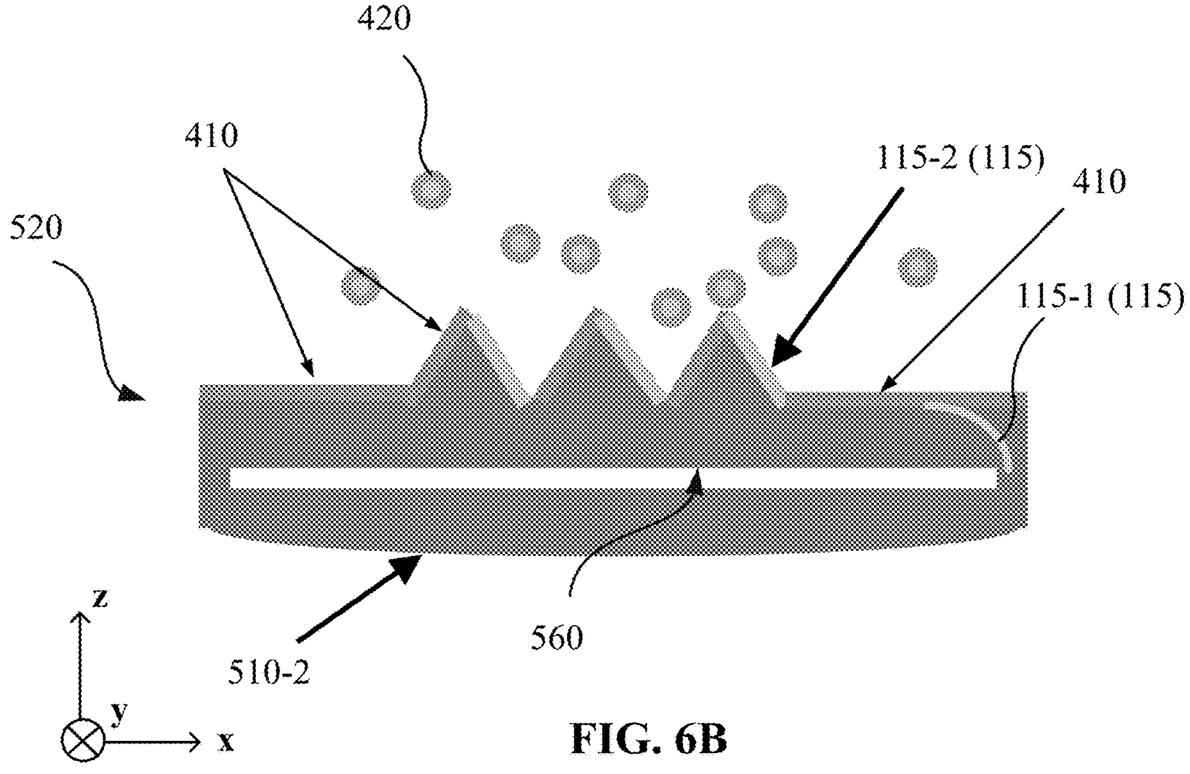
Figure 6C:
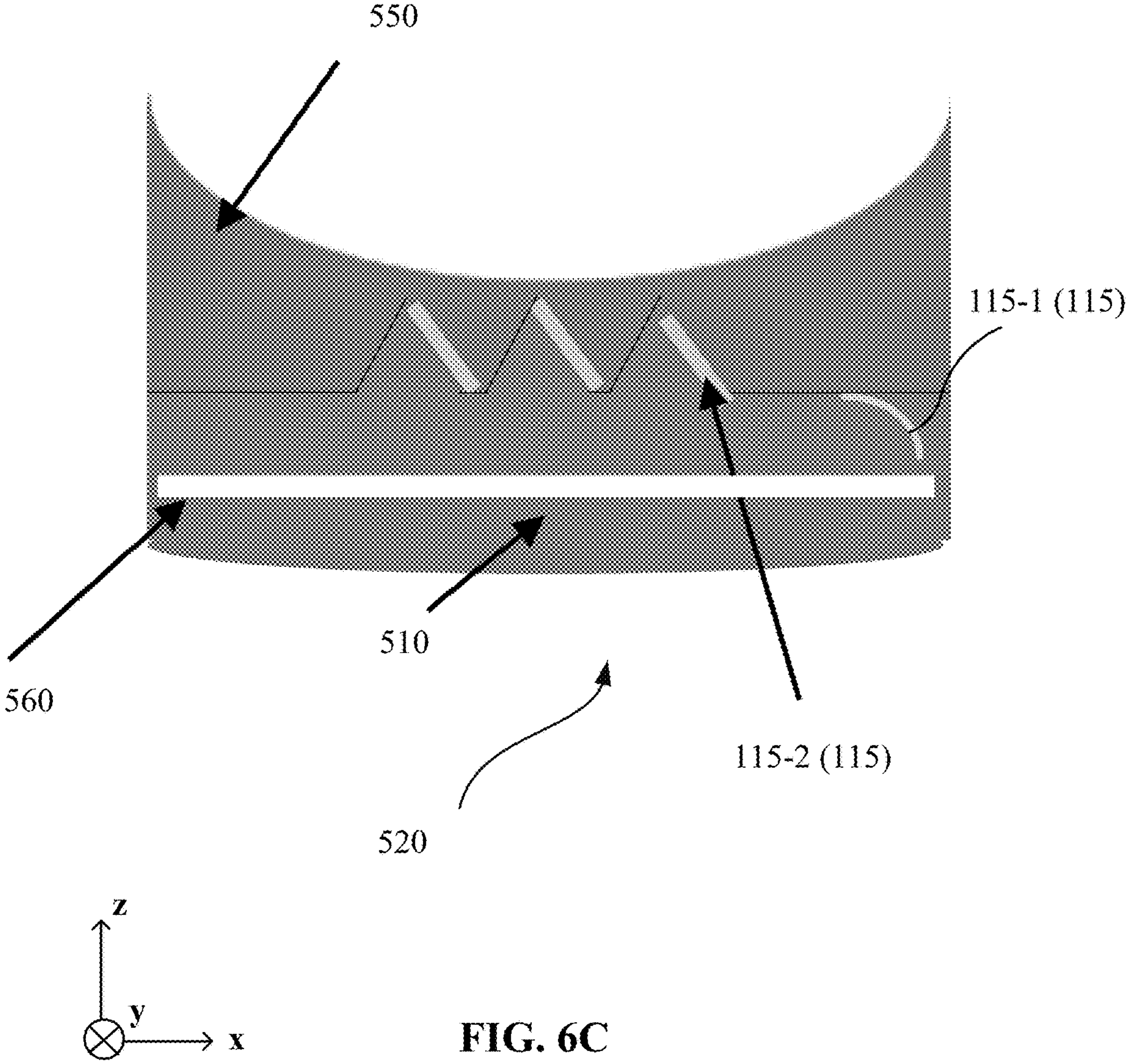

FIGS. 6A-6C illustrate processes for integrating the waveguide 520 and the prescription lens 350 shown in FIG. 5, according to an embodiment of the present disclosure. The processes shown in FIGS. 6A-6C may include steps that are the same as or similar to those included in the processes shown in FIGS. 2A-2C or FIGS. 4A-4C. Descriptions of the same or similar steps included in the embodiments shown in FIGS. 6A-6C can refer to the above descriptions, including those rendered in connection with the embodiment shown in FIGS. 2A-2C or FIGS. 4A-4C. As shown in FIGS. 6A-6C, the fabrication steps of integrating the waveguide 520 and the prescription lens 350 may be similar to the fabrication steps of integrating the waveguide 320 and the prescription lens 350 shown in FIGS. 4A-4C, except that the substrate 510 may be provided with the embedded medium layer 560. The detailed descriptions of the steps shown in FIGS. 6A-6C are not repeated.

Figure 7:
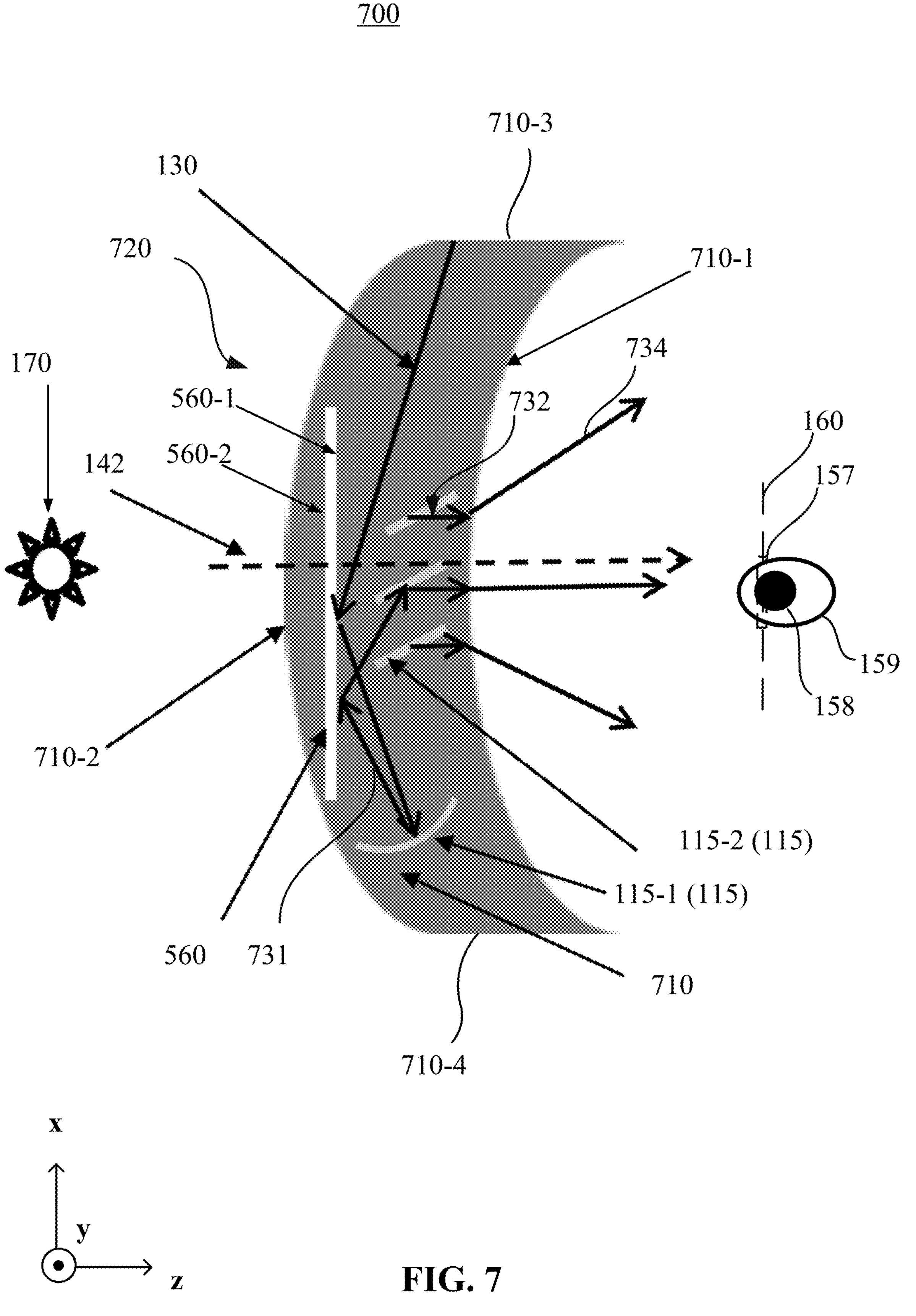
FIG. 7 illustrates a schematic diagram of an optical system including a waveguide integrated with a prescription lens, according to an embodiment of the present disclosure.

FIG. 7 illustrates an x-z sectional view of an optical system 700, according to an embodiment of the present disclosure. The optical system 700 shown in FIG. 7 may include structures or elements that are the same as or similar to those included in the optical system 100 shown in FIG. 1, the optical system 300 shown in FIG. 3, or the optical system 500 shown in FIG. 5. Descriptions of the same or similar structures or elements included in the embodiment shown in FIG. 7 can refer to the above descriptions, including those rendered in connection with the embodiments shown in FIG. 1, FIG. 3, or FIG. 5.

As shown in FIG. 7, the optical system 700 may include a single-piece waveguide 720 with an integrated prescription lens function. That is, the waveguide 720 function both as a waveguide and a lens. In some embodiments, the waveguide 720 may be considered as being encapsulated within a 3D printed lens. The optical system 700 may also include a light source assembly (not shown, e.g., similar to the light source assembly 105 shown in FIG. 1) coupled with the waveguide 720. The waveguide 720 may guide the image light received from the light source assembly to propagate toward the eye-box region 160.

The waveguide 720 may include a substrate 710 (that is a main body of the waveguide 720) and the micro-structures 115 substantially entirely embedded within the substrate 710. The micro-structures 115 may include one or more out-coupling structures (e.g., flat reflectors) 115-2, and one or more folding structures (e.g., curved reflector) 115-1. In some embodiments, the waveguide 720 may also include the medium layer 560 embedded within the substrate 710 for facilitating TIR of the image light inside the waveguide 720. The entire substrate 710 may be integrally formed (e.g., 3D printed) as a single piece, which provides both the image light guidance and the vision correction. In some embodiments, the entire substrate 710 may be formed based on a suitable material, such as a plastic material having a refractive index of about 1.53.

The substrate 710 (or the waveguide 720) may have a first surface (or back surface) 710-1 facing the eye-box region 160 and a second surface (or front surface) 710-2 opposite to the first surface (or back surface) 710-1. In some embodiments, both the first surface (or back surface) 710-1 and the second surface (or front surface) 710-2 may be curved with suitable curvatures to provide an optical power for vision correction. In some embodiments, the first surface (or back surface) 710-1 may be curved to provide an optical power for vision correction, whereas the second surface (or front surface) 710-2 may be flat. For discussion purposes, FIG. 7 shows the second surface (or front surface) 710-2 is a curve surface, and the medium layer 560 is embedded within the substrate 710, between the out-coupling structures 115-2 and the second surface 710-2, and between the folding structure 115-1 and the second surface 710-2. The medium layer 560 may facilitate the TIR of the image light at the first side 560-1 of the medium layer 560. In some embodiments, the second surface (or front surface) 710-2 may be a flat surface, and the medium layer 560 may be omitted since air outside of the flat surface 710-2 may function as an air gap for facilitating the TIR of the image inside the waveguide 720.

The waveguide 720 may guide the image light 130 to propagate from a light inputting surface (e.g., a third surface 710-3 of the substrate 710 or the waveguide 720 shown in FIG. 7) to a light outputting surface (e.g., the first surface 710-1 of the substrate 710 or the waveguide 720 shown in FIG. 7). The waveguide 720 may also provide a custom optical power to the image light 130. As shown in FIG. 7, the image light 130 may first propagate inside the substrate 710 toward the curved reflector 115-1 via TIR at the first side 560-1 of the medium layer 560. The curved reflector 115-1 may reflect the image light 130 back to the first side 560-1 of the medium layer 560 as an image light 731. The image light 731 may be totally internally reflected at the first side 560-1 of the medium layer 560 toward to the flat reflectors 115-2. The flat reflectors 115-2 may be configured to couple, via reflection, the image light 731 out of the substrate 710 as a plurality of output image lights 732 propagating toward the first surface 710-1 of the substrate 710. The first surface 710-1 may focus (or converge) or defocus (or diverge) each output image light 732 into an image light 734, which may propagate toward the eye-box region 160. It is noted that the TIR of the image lights 130 and 731 may only occur at the first side 560-1 of the medium layer 560, and may not occur at the first surface 710-1 of the substrate 710. Thus, a medium layer similar to the medium layer 560 may not be needed between the first surface 710-1 of the substrate 710 and the flat reflectors 115-2.

Figure 8A:
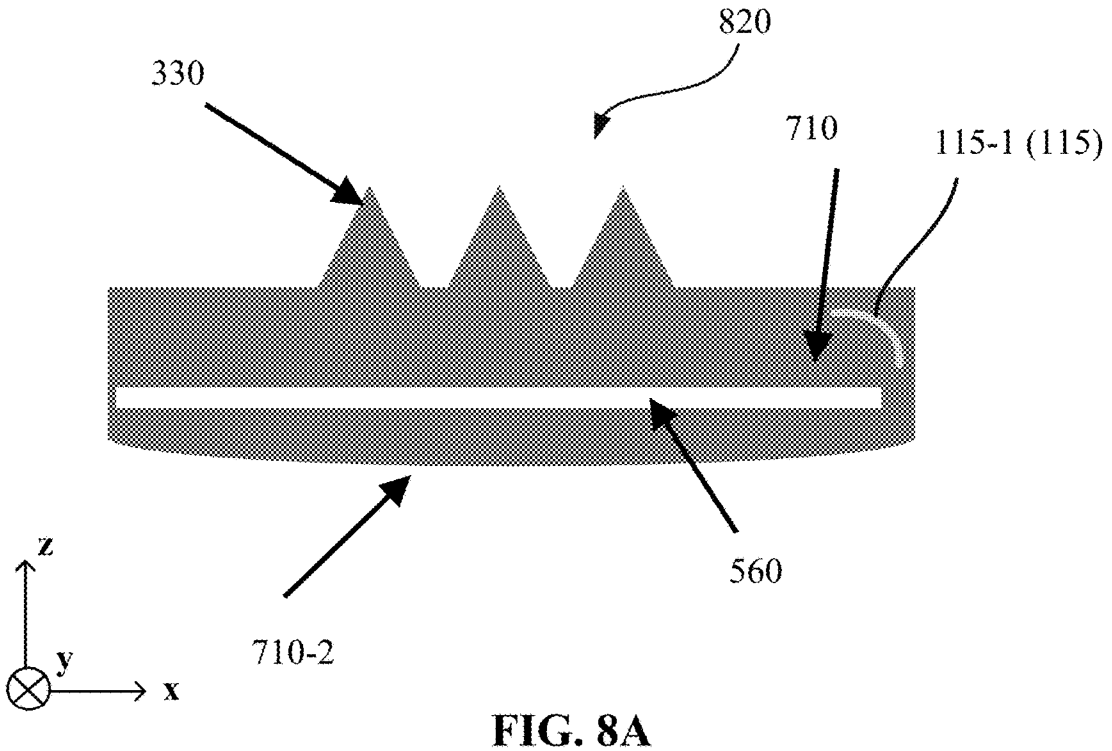
FIGS. 8A-8C illustrate processes for integrating the prescription lens with the waveguide shown in FIG. 7, according to an embodiment of the present disclosure.
Figure 8B:
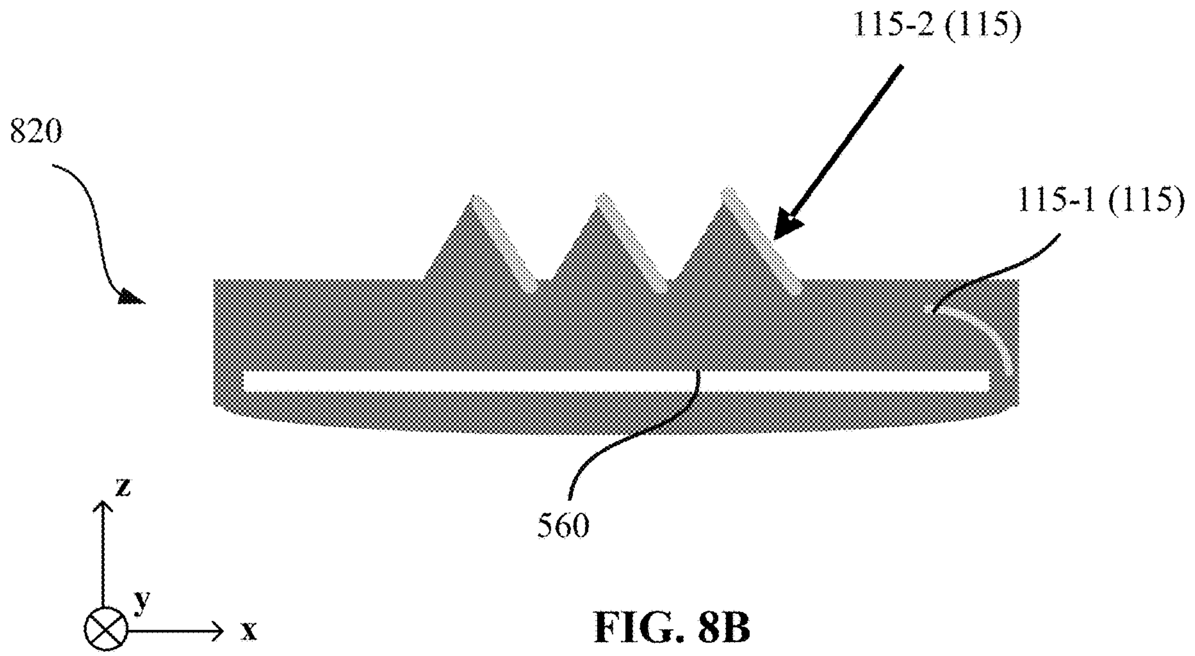
Figure 8C:
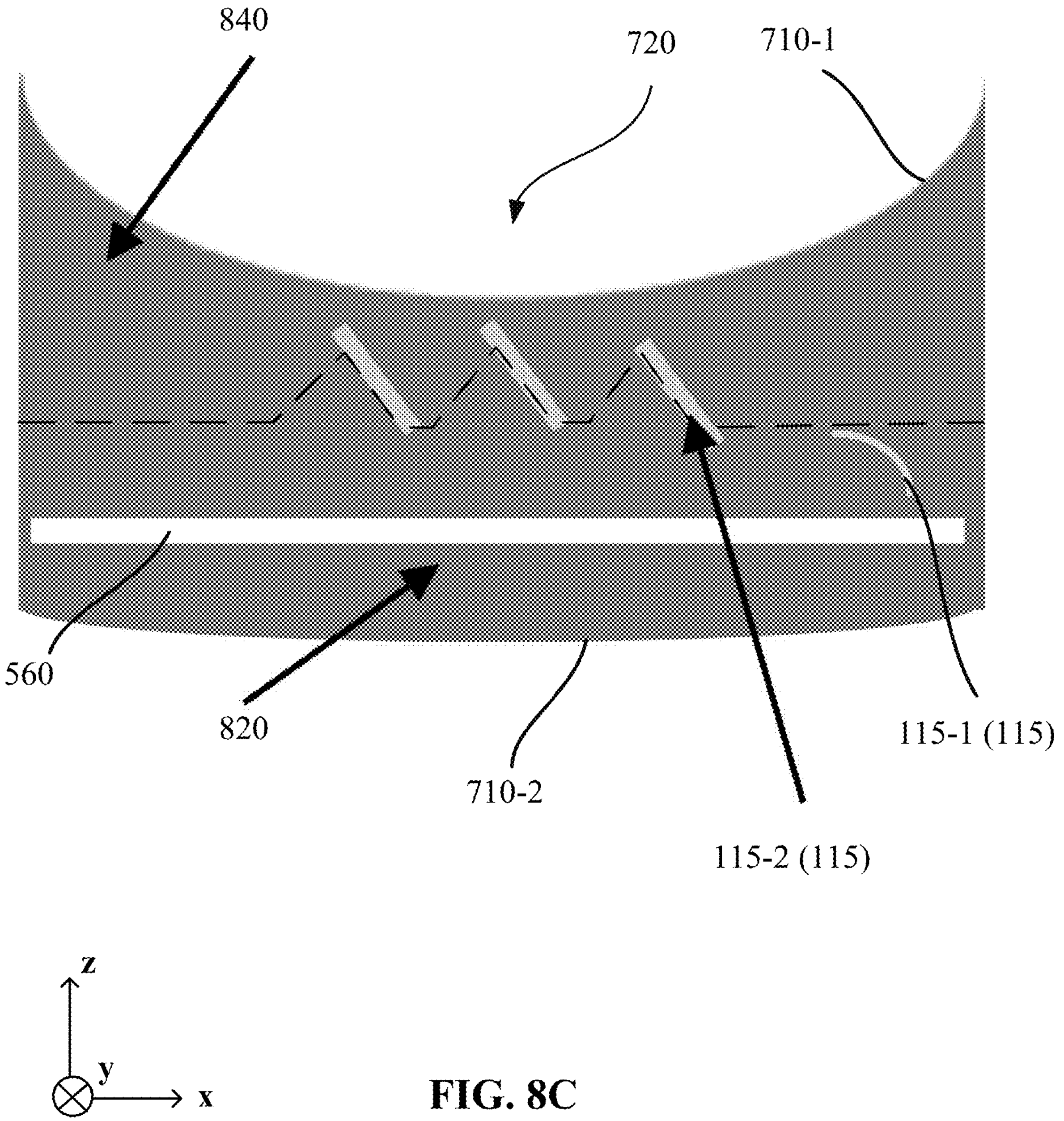

FIGS. 8A-8C illustrate processes for fabricating the waveguide 720 shown in FIG. 7, according to an embodiment of the present disclosure. The processes shown in FIGS. 8A-8C may include steps that are the same as or similar to those included in the processes shown in FIGS. 2A-2C, FIGS. 4A-4C, or FIGS. 6A-6C. Descriptions of the same or similar steps included in the embodiments shown in FIGS. 8A-8C can refer to the above descriptions, including those rendered in connection with the embodiment shown in FIGS. 2A-2C, FIGS. 4A-4C, or FIGS. 6A-6C. In the embodiment shown in FIGS. 8A-8C, substantially the entire waveguide 720 having the integrated lens function may be 3D printed. As shown in FIG. 8C, the single-piece waveguide 720 may be virtually divided into a waveguide portion (or substrate portion) 820 and a lens portion 840, although it is understood that these two portions are integral portions that are formed during a same 3D printing process using the same material, and are not physically separated. The waveguide portion 820 may be configured to guide the image light from a light inputting surface thereof to a light outputting surface thereof, toward the lens portion 840. The lens portion 840 may be configured to provide a custom optical power to the image light output from the waveguide portion (or substrate portion) 820. The virtual division is solely for the convenience of discussion.

In some embodiments, although not shown, the substrate portion 820 and the lens portion 840 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

As shown in FIG. 8A, the substrate portion 820 configured with the supporting structures 330 may be 3D printed. In some embodiments, when the second surface (or the front surface) 710-2 is curved, the medium layer 560 may be formed in the substrate portion 820 during the 3D printing process. For example, when the medium layer 560 is a solid layer having a lower refractive index lower than the substrate portion 820, the medium layer 560 may be directly 3D printed during the 3D printing process of the substrate portion 820. When the medium layer 560 is an air gap (e.g., a cavity filled with air), surrounding parts may be 3D printed to form the cavity with air during the 3D printing process of the substrate portion 820. In some embodiments, when the second surface (or the front surface) 710-2 of the substrate 710 is flat, the medium layer 560 may be omitted.

In some embodiments, during the 3D printing process of the substrate portion 820, a curved supporting structure may be 3D printed, and a metal layer may be 3D printed onto the curved supporting structure to form the folding structure (e.g., concave reflector) 115-1. The medium layer 560 may be located between the folding structure (e.g., concave reflector) 115-1 and the second surface 710-2. In some embodiments, the folding structure (e.g., concave reflector) 115-1 may be 3D printed in the lens portion 840, rather than in the substrate portion 820. For discussion purposes, FIG. 8A shows the folding structure (e.g., concave reflector) 115-1 is formed in the substrate portion 820.

As shown in FIG. 8B, the out-coupling structures (e.g., flat reflectors) 115-2 may be formed on the predetermined surfaces of the supporting structures 330 through a suitable method. In some embodiments, the out-coupling structures (e.g., flat reflectors) 115-2 may be formed through 3D printing. For example, metals may be 3D printed over the predetermined surfaces of the supporting structures 330 to form the flat reflectors 115-2. In some embodiments, the out-coupling structures (e.g., flat reflectors) 115-2 may be formed on the predetermined surfaces of the supporting structures 330 via metal deposition.

As shown in FIG. 8C, after the out-coupling structures (e.g., flat reflectors) 115-2 are formed, the lens portion 840 may be 3D printed over the substrate portion 820 and the out-coupling structures (e.g., reflectors) 115-2. The first surface (or the back surface) 710-1 of the substrate 710 may be configured with a curved shape to provide the custom optical power. The lens portion 840 may cover the entire out-coupling structures 115-2. That is, the entire out-coupling structures 115-2 may be embedded between the substrate portion 820 and the lens portion 840.

Figure 9A:
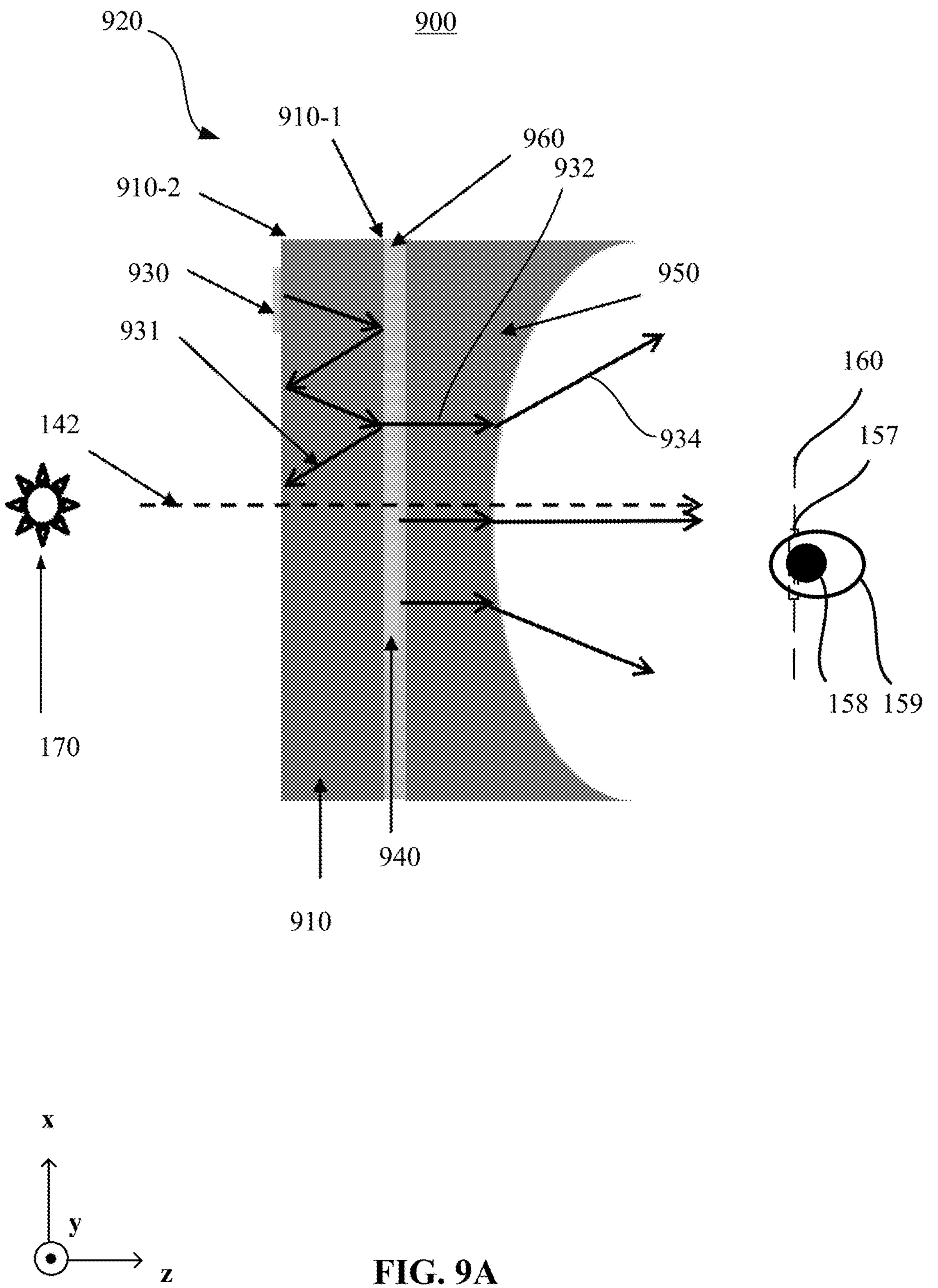
FIG. 9A illustrates a schematic diagram of an optical system including a waveguide integrated with a prescription lens, according to an embodiment of the present disclosure.
Figure 9B:
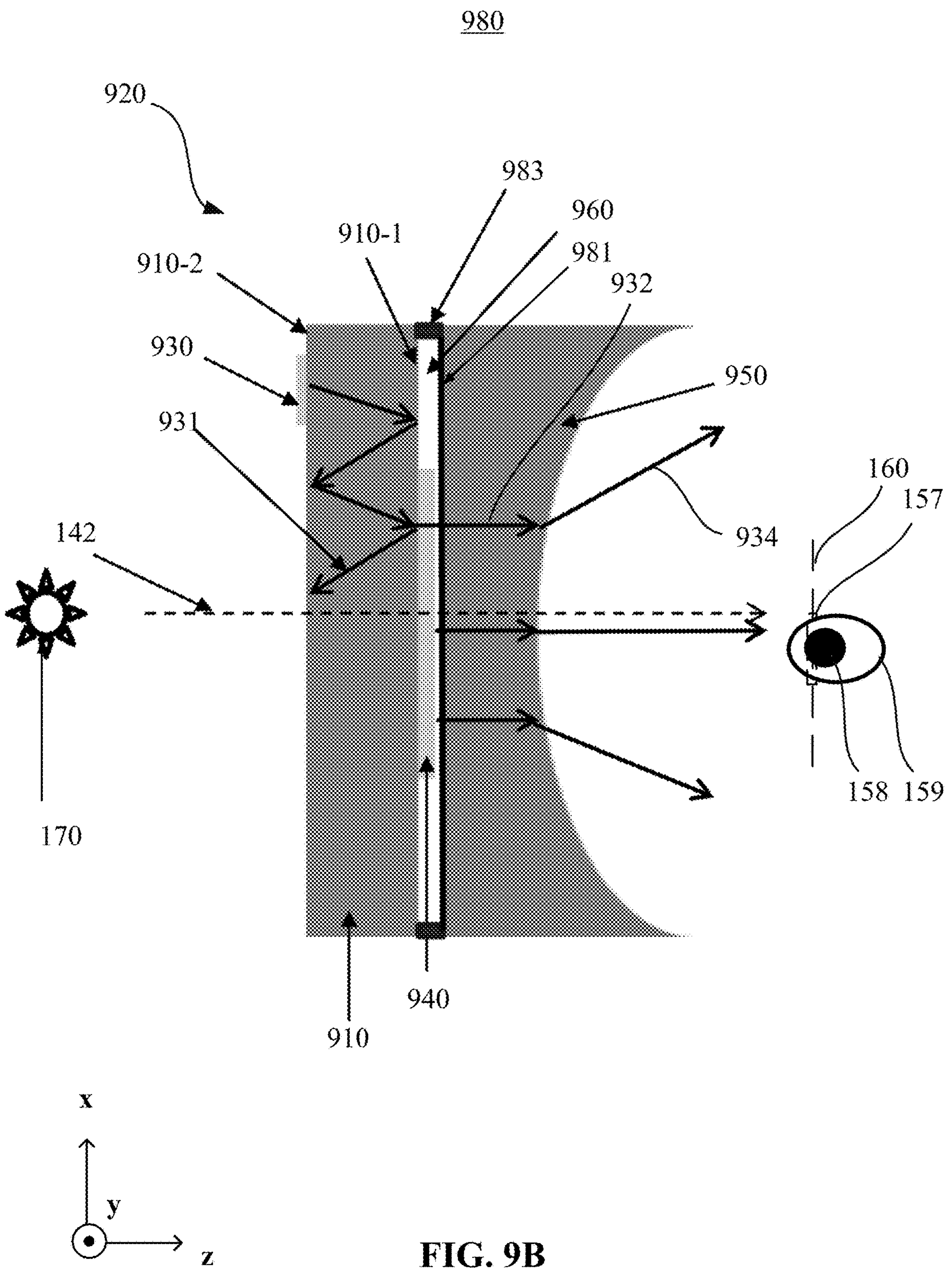
FIG. 9B illustrates a schematic diagram of an optical system including a waveguide integrated with a prescription lens, according to an embodiment of the present disclosure.

FIG. 9A illustrates an x-z sectional view of an optical system 900, according to an embodiment of the present disclosure. FIG. 9B illustrates an x-z sectional view of an optical system 980, according to an embodiment of the present disclosure. The optical system 900 shown in FIG. 9A and the optical system 980 shown in FIG. 9B may include structures or elements that are the same as or similar to those included in the optical system 100 shown in FIG. 1, the optical system 300 shown in FIG. 3, the optical system 500 shown in FIG. 5, or the optical system 700 shown in FIG. 7.

Descriptions of the same or similar structures or elements included in the embodiment shown in FIG. 9A or FIG. 9B can refer to the above descriptions, including those rendered in connection with the embodiments shown in FIG. 1, FIG. 3, FIG. 5, or FIG. 7.

As shown in FIG. 9A, the optical system 900 may include a waveguide 920, and a prescription (Rx) lens 950 printed (e.g., 3D printed) over the waveguide 920. The optical system 900 may also include a light source assembly (not shown, e.g., similar to the light source assembly 105 shown in FIG. 1) coupled with the waveguide 920, and the light source assembly may output an image light representing a virtual image. The waveguide 920 may include a substrate 910, an in-coupling element 930, an out-coupling element 940, and/or a folding element (not shown). The waveguide 920 may guide the image light (e.g., emitted by the light source assembly) to propagate from a light inputting surface 910-2 of the substrate 910 to a light outputting surface 910-1 of the substrate 910. The prescription lens 950 may be 3D printed over the light outputting surface 910-1 of the substrate 910. The light outputting surface 910-1 may also be referred to as a back surface or a first surface of the substate 910, and the light inputting surface 910-2 may also be referred to as a front surface or a second surface of the substate 910.

Each of the in-coupling element 930, the out-coupling element 940, and the folding element (not shown) may be disposed at the front surface 910-2 or the back surface 910-1 of the substrate 910, or may be at least partially embedded in the substrate 910. For illustrative and discussion purposes, in FIG. 9A, the in-coupling element 930 and the out-coupling element 940 are shown as being disposed on the front surface 910-2 and the back surface 910-1 of the substrate 910, respectively. Each of the of the in-coupling element 930, the out-coupling element 940, and the folding element (not shown) may include any suitable coupling element, e.g., a diffraction grating, a cascaded reflector, a prismatic surface element, or a holographic reflector, etc. In some embodiment, as shown in FIG. 9A, the in-coupling element 930 may couple the image light received from the light source assembly into the substate 910 at the light inputting surface (e.g., the front surface) 910-2 as an in-coupled image light 931. The in-coupled image light 931 may propagate inside the substrate 910 via TIR. The out-coupling element 940 may couple the in-coupled image light 931 out of the substrate 910 at the light outputting surface (e.g., the back surface) 910-1 as a plurality of output image lights 932 propagating toward the prescription lens 950. The prescription lens 950 may focus (or converge) or defocus (or diverge) each output image light 932 into an image light 934, which may propagate toward the eye-box region 160 of the optical system 900.

In some embodiments, the substrate 910 may be formed by injection molding, and the prescription lens 950 may be 3D printed on the back surface 910-1 of the substrate 910. In some embodiments, the substrate 910 and the prescription lens 950 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the substrate 910 and the prescription lens 950 may be formed using a same material. In the embodiment shown in FIG. 9A, the TIR of the in-coupled image light 931 may occur at both the back surface 910-1 and the front surface 910-2 of the substrate 910. In some embodiments, to facilitate the TIR of the in-coupled image light 931 at the back surface 910-1, a medium layer 960 may be disposed at the back surface 910-1 of the substrate 910, between the back surface 910-1 and the prescription lens 950. The medium layer 960 may be configured with a refractive index lower than that of the substrate 910. In some embodiments, as shown in FIG. 9A, the medium layer 960 may include a solid medium layer. In some embodiments, the solid medium layer 960 may be an optical clear adhesive layer. In some embodiments, as shown in FIG. 9B, the medium layer 960 may include an air gap, e.g., a cavity filled with air, which may be formed by pillars 983 and a cover plate 981. The pillars 983, the cover plate 981, and the back surface 910-1 together form a cavity that is filled with air. In some embodiments, the back surface 910-1 of the substrate 910 may be provided with other layers or coatings. In some embodiments, when the front surface 910-2 of the substrate 910 is a curved surface, a similar medium layer having a refractive index lower than that of the substrate 910 may be disposed at the front surface 910-2 of the substrate 910 or embedded in the substate 910 between the first surface 910-1 and the second surface 910-2.

Figure 10A:
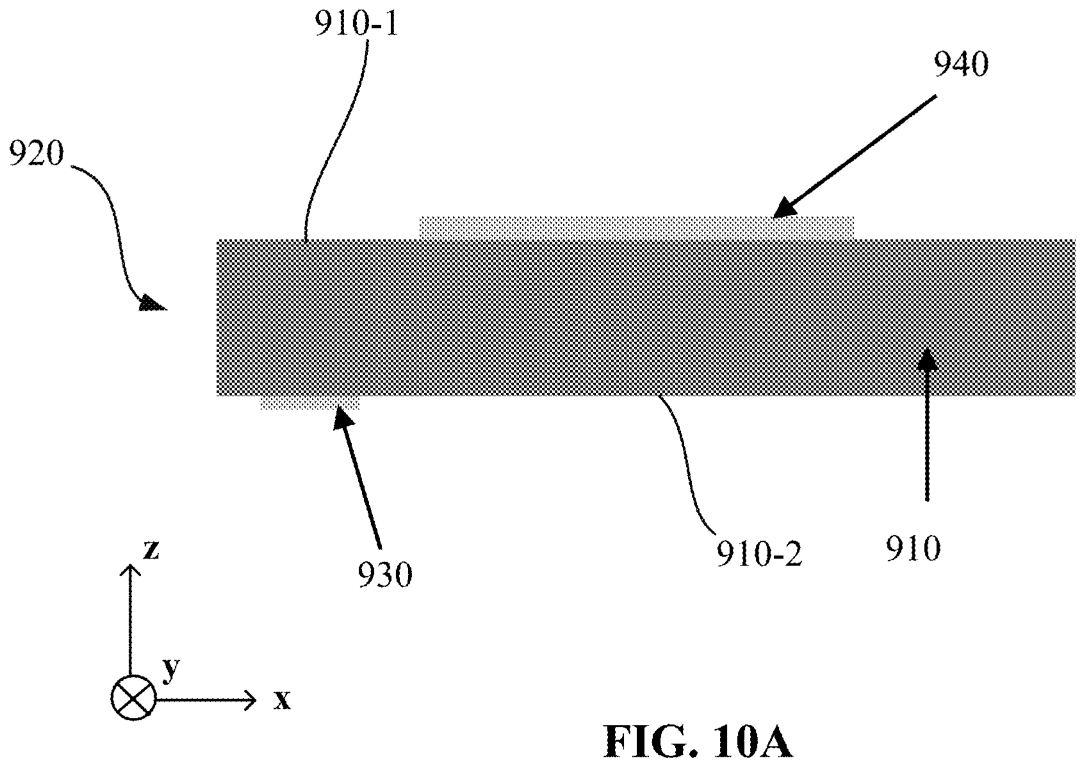
FIGS. 10A-10C illustrate processes for integrating the prescription lens with the waveguide shown in FIGS. 9A and 9B, according to various embodiments of the present disclosure.
Figure 10B:
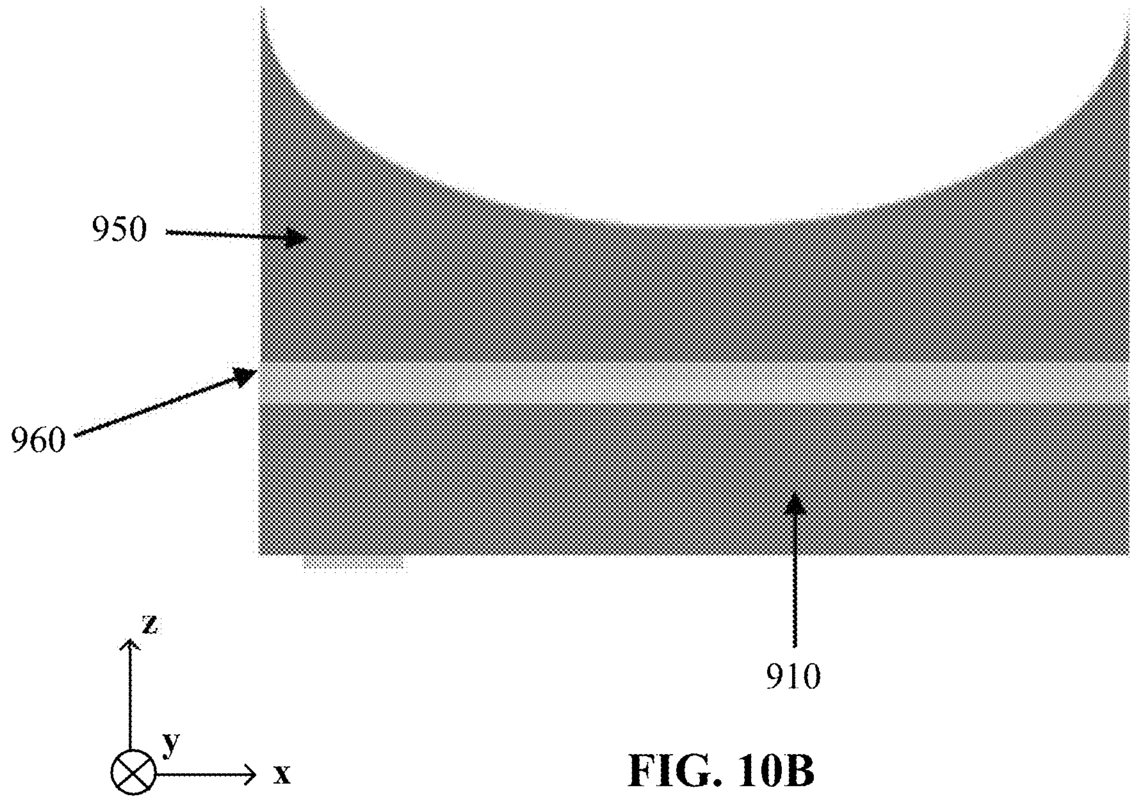
Figure 10C:
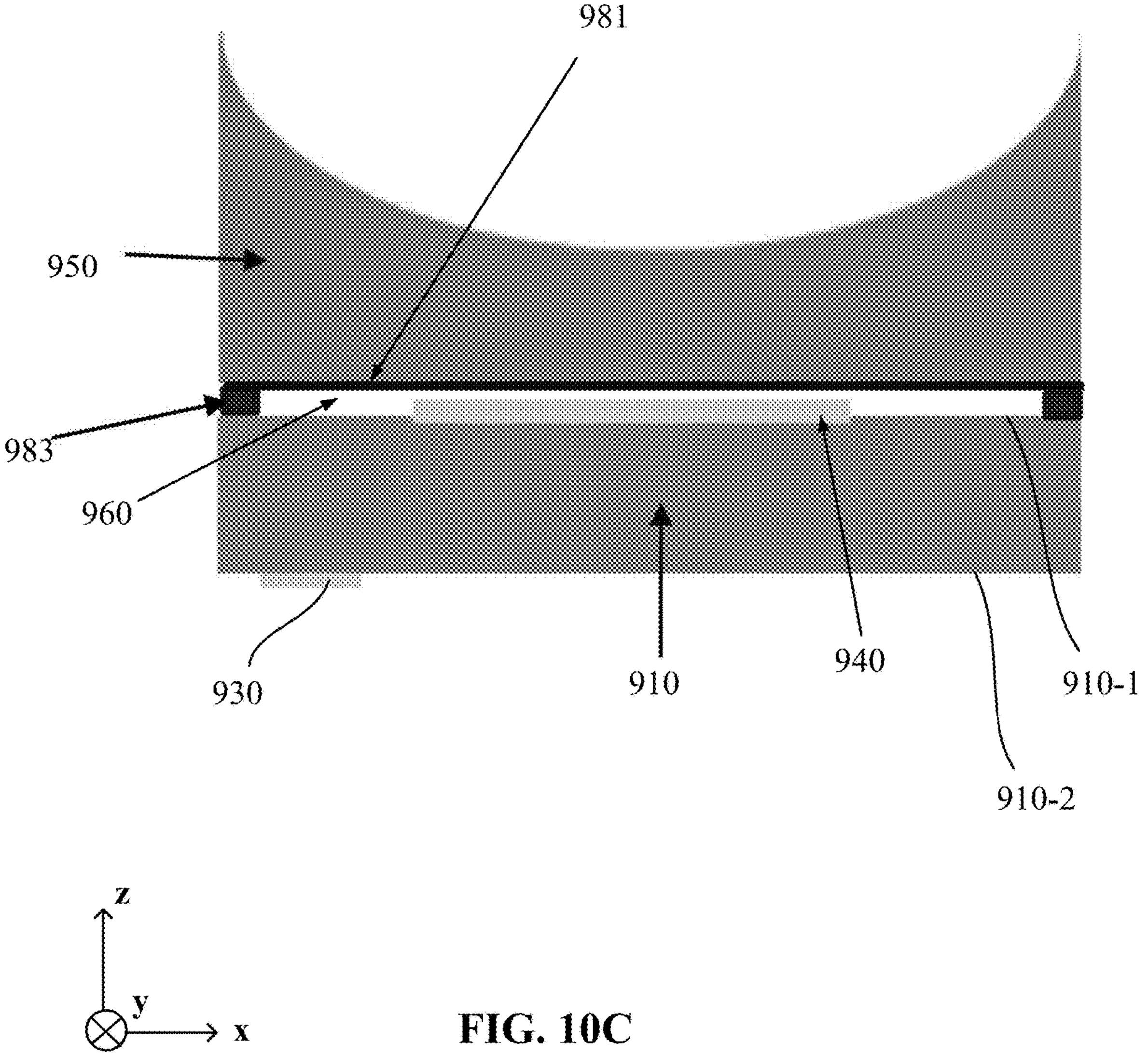

FIGS. 10A-10C illustrate processes for integrating the waveguide 920 and the prescription lens 950 shown in FIG. 9A and FIG. 9B, according to some embodiments of the present disclosure. The processes shown in FIGS. 10A-10C may include steps that are the same as or similar to those included in the processes shown in FIGS. 2A-2C, FIGS. 4A-4C, FIGS. 6A-6C, or FIGS. 8A-8C. Descriptions of the same or similar steps included in the embodiments shown in FIGS. 10A-10C can refer to the above descriptions, including those rendered in connection with the embodiment shown in FIGS. 2A-2C, FIGS. 4A-4C, FIGS. 6A-6C, or FIGS. 8A-8C.

As shown in FIG. 10A, the waveguide 920 including the substrate 910 may be provided. The waveguide 920 may include the substrate 910, the in-coupling element 930, and the out-coupling element 940. In some embodiments, the waveguide 920 may also include the folding element (not shown). The descriptions of the waveguide 920 can refer to the above corresponding descriptions, including those rendered in connection with FIG. 9A and FIG. 9B. In some embodiments, the substrate 910 may be formed by injection molding. As shown in FIG. 10B, the prescription lens 950 may be printed (e.g., through 3D printing) over the back surface (e.g., the light outputting surface) 910-1 of the substrate 910. In some embodiments, the substrate 910 and the prescription lens 950 may be 3D printed using a same material. In some embodiments, the substrate 910 and the prescription lens 950 may be fabricated based on two different materials having substantially close refractive indices, e.g., substantially close to 1.53. For example, the two different materials may be a first material having a first refractive index of 1.52 and a second material having a second refractive index of 1.53, a first material having a first refractive index of 1.52 and a second material having a second refractive index of 1.54, a first material having a first refractive index of 1.525 and a second material having a second refractive index of 1.53, a first material having a first refractive index of 1.525 and a second material having a second refractive index of 1.535, a first material having a first refractive index of 1.53 and a second material having a second refractive index of 1.535, etc. The difference between the first refractive index and the second refractive index may be less than or equal to 0.05, 0.1, 0.15, or 0.2, which may be regarded as "substantially close." In some embodiments, each of the first refractive index and the second refractive index may be any suitable value within a range of [1.52, 1.53], [1.525, 1.535], [1.52, 1.54], [1.53, 1.54], etc.

In some embodiments, the fabrication processes shown in FIG. 10A may include addition steps. For example, after the waveguide 920 is provided and before the prescription lens 950 is 3D printed over the substrate 910, the medium layer (e.g., solid material layer) 960 may be formed on the back surface 910-1 of the substrate 910, as shown in FIG. 10B. In some embodiments, the solid material layer 960 may be formed onto the back surface 910-1 of the substrate 910 using any suitable method other than 3D printing. In some embodiments, the solid material layer 960 may be 3D printed onto the back surface 910-1 of the substrate 910. Then the prescription lens 950 may be directly printed (e.g., through 3D printing) on the solid medium layer 960. In some embodiments, the prescription lens 950 may cover the area of the entire back surface 910-1 of the substrate 910. In some embodiments, the prescription lens 950 may cover only an area of the out-coupling element 940. In the fabrication processes shown in FIG. 10C, the solid material layer 960 may be an air gap, which may be 3D printed over the back surface 910-1 of the substrate 910. The air gap may be a cavity filled with air. For example, the pillars 983 and the cover plate 981 may be 3D printed to form a cavity over the back surface 910-1 of the substrate 910, and the cavity may be filled by air. Then the prescription lens 950 may be printed over the cavity (e.g., on the cover plate 981).

Figure 11A:
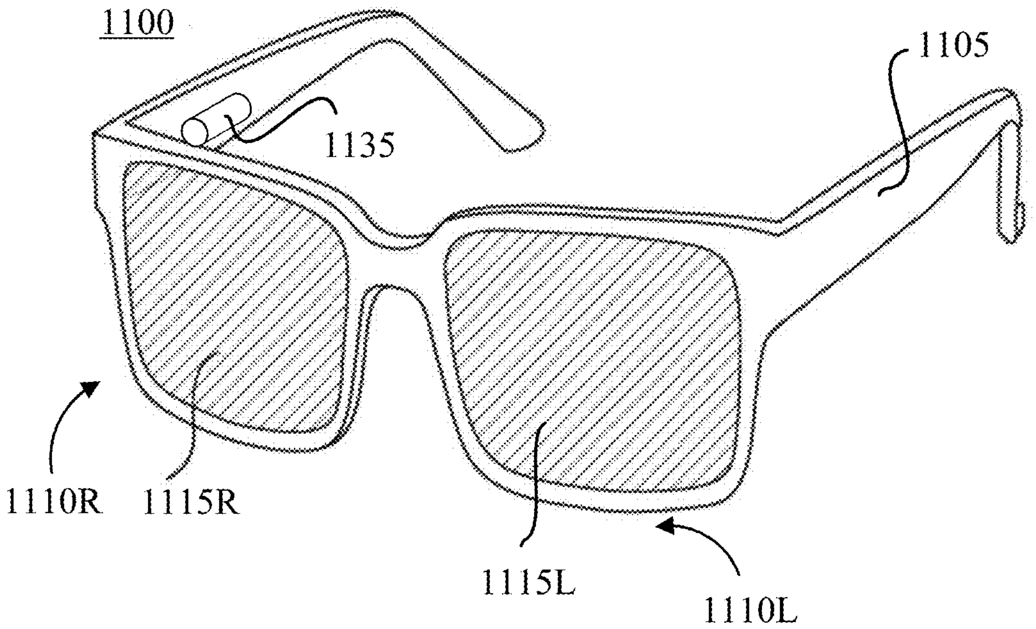
FIG. 11A illustrates a schematic diagram of an artificial reality device, according to an embodiment of the present disclosure.

FIG. 11A illustrates a schematic diagram of an artificial reality device 1100 according to an embodiment of the present disclosure. In some embodiments, the artificial reality device 1100 may produce VR, AR, and/or MR content for a user, such as images, video, audio, or a combination thereof. In some embodiments, the artificial reality device 1100 may be smart glasses. In one embodiment, the artificial reality device 1100 may be a near-eye display ("NED"). In some embodiments, the artificial reality device 1100 may be in the form of eyeglasses, goggles, a helmet, a visor, or some other type of eyewear. In some embodiments, the artificial reality device 1100 may be configured to be worn on a head of a user (e.g., by having the form of spectacles or eyeglasses, as shown in FIG. 11A), or to be included as part of a helmet that is worn by the user. In some embodiments, the artificial reality device 1100 may be configured for placement in proximity to an eye or eyes of the user at a fixed location in front of the eye(s), without being mounted to the head of the user. In some embodiments, the artificial reality device 1100 may be in a form of eyeglasses which provide vision correction to a user's eyesight. In some embodiments, the artificial reality device 1100 may be in a form of sunglasses which protect the eyes of the user from the bright sunlight. The artificial reality device 1100 may be in a form of safety glasses which protect the eyes of the user. In some embodiments, the artificial reality device 1100 may be in a form of a night vision device or infrared goggles to enhance a user's vision at night.

Figure 11B:
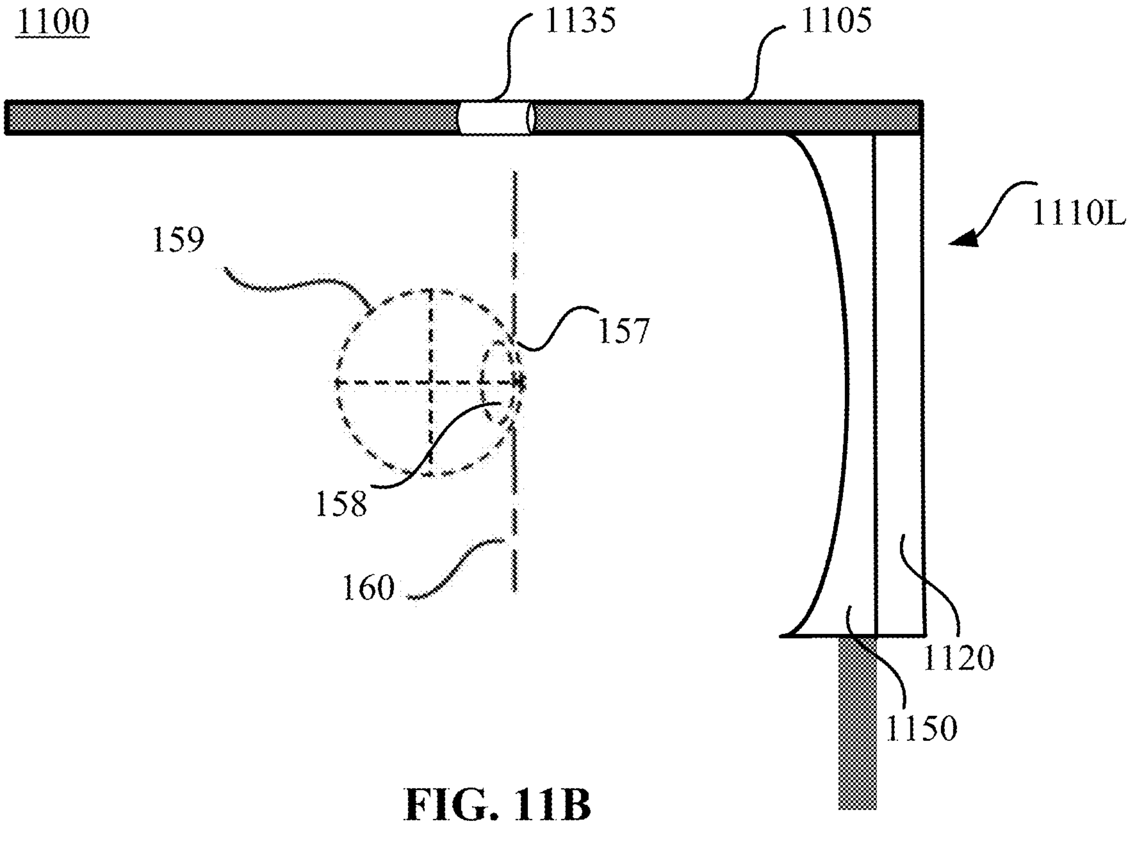
FIG. 11B schematically illustrates a cross-sectional view of half of the artificial reality device shown in FIG. 11A, according to an embodiment of the present disclosure.

For discussion purposes, FIG. 11A shows that the artificial reality device 1100 includes a frame 1105 configured to mount to a user's head, and left-eye and right-eye display systems 1110L and 1110R mounted to the frame 1105. FIG. 11B is a cross-sectional view of half of the artificial reality device 1100 shown in FIG. 11A according to an embodiment of the present disclosure. For illustrative purposes, FIG. 11B shows the cross-sectional view associated with a left-eye display system 1110L. The frame 1105 is merely an example structure to which various components of the artificial reality device 1100 may be mounted. Other suitable type of fixtures may be used in place of or in combination with the frame 1105.

In some embodiments, each of the left-eye display system 1110L and the right-eye display system 1110R may include a waveguide display system configured to project computer-generated virtual images into left and right display windows 1115L and 1115R. The waveguide display system may include a light source assembly 1135 configured to generate an image light representing a virtual image. The waveguide display system may also include a waveguide 1120 and a plurality of coupling structures (not shown) configured to guide the image light toward the eye-box region 160. The waveguide display system may be an embodiment of the waveguide display systems disclosed herein, such as the optical system 100 shown in FIG. 1, the optical system 300 shown in FIG. 3, the optical system 500 shown in FIG. 5, the optical system 700 shown in FIG. 7, or the optical system 900 shown in FIG. 9A or FIG. 9B. The waveguide 1120 may be an embodiment of the waveguides disclosed herein, such as the waveguide 120 shown in FIG. 1, the waveguide 320 shown in FIG. 3, the waveguide 520 shown in FIG. 5, the waveguide 720 shown in FIG. 7, or the waveguide 920 shown in FIG. 9A or FIG. 9B.

In some embodiments, as shown in FIG. 11B, each of the left-eye display system 1110L and the right-eye display system 1110R may also include an ophthalmic lens (also referred to as a prescription lens) 1150 that is disclosed between the left-eye display system 1110L (or the right-eye display system 1110R) and the eye-box region 160. The prescription lens 1150 may be 3D printed over the waveguide 1120, and may be the prescription lens 150 shown in FIG. 1, the prescription lens 350 shown in FIG. 3, the prescription lens 350 shown in FIG. 5, or the prescription lens 950 shown in FIG. 9A. In some embodiments, the waveguide 120 and the prescription lens 1150 may take the form of the optical system 700 shown in FIG. 7, i.e., a single-piece waveguide integrated with a lens function (i.e., the waveguide and the lens may be 3D printed as a single piece). The prescription lens 1150 may be a suitable prescription lens that provides vision correction to a user's eyesight, e.g., single vision, bifocal, trifocal, or progressive lens. The prescription lens 1150 may be configured to alter the image light output from the waveguide 1120 to provide vision correction to the user's eyesight, while transmitting the image light to the user wearing the artificial reality device 1100.

In some embodiments, the prescription lens 1150 may also be replaced by a non-prescription lens that is 3D printed over the waveguide included in the waveguide display system. For example, the non-prescription lens may function as a flat slab or a curved slab with zero optical power for the image light. The non-prescription lens may not alter the image light output from the waveguide 1120, while transmitting the image light to the user wearing the artificial reality device 1100.

Figure 12:
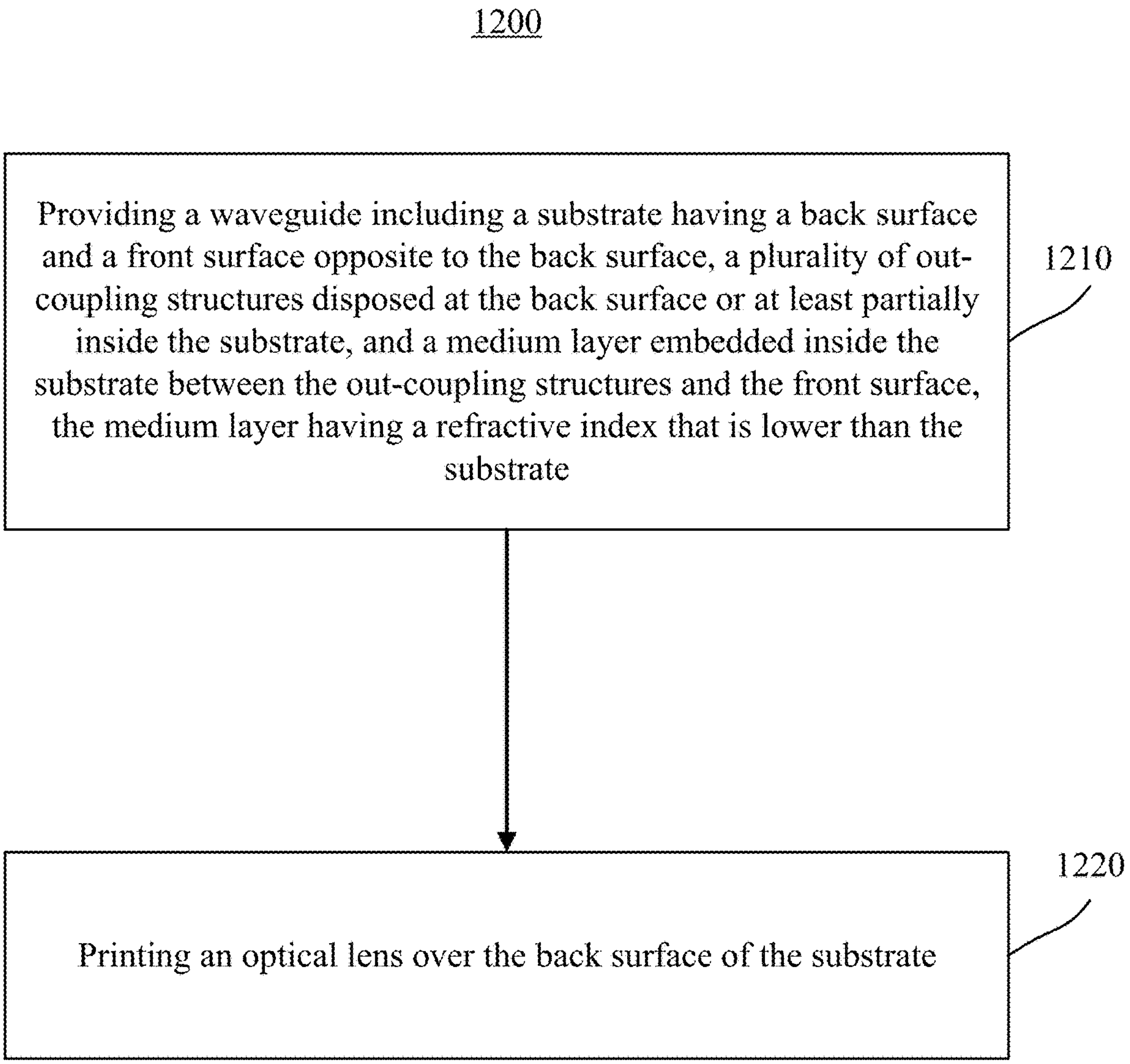
FIG. 12 is a flowchart illustrating a method for fabricating a waveguide with an integrated prescription lens, according to an embodiment of the present disclosure.

FIG. 12 is a flowchart illustrating a method 1200 for fabricating a waveguide with an integrated prescription lens, according to an embodiment of the present disclosure. The method 1200 may include providing a waveguide including a substrate having a back surface and a front surface opposite to the back surface, a plurality of out-coupling structures disposed at the back surface or at least partially inside the substrate, and a medium layer embedded inside the substrate between the out-coupling structures and the front surface, the medium layer having a refractive index that is lower than the substrate (step 1210). In some embodiments, providing the waveguide may include forming the waveguide through injection molding. In some embodiments, providing the waveguide may include forming the waveguide through 3D printing. The method 1200 may also include printing an optical lens over the back surface of the substrate (step 1220). In some embodiments, printing the optical lens over the back surface of the substrate may include 3D printing the optical lens over the back surface of the substrate. The method 1200 may include other specific steps described above in connection with other figures, which are not repeated here.

The present disclosure provides a waveguide with a prescription lens (or a waveguide having an integrated prescription lens function). In some embodiments, the waveguide may include reflectors that provide a substantially high reflection for the image light. The reflectors may provide high color uniformity and a high light efficiency (e.g., 10-15%). The waveguide may be made of a plastic material, which may provide shock resistance and there may be no coefficient of thermal expansion ("CTE") mismatch. The disclosed fabrication methods may provide simple manufacturing processes for integrating custom prescription lens with the waveguide. Compared to conventional technology, the disclosed technical solutions can provide a waveguide with a prescription lens (or with a prescription lens function) that has a reduced thickness, a lighter weight, and a smaller form factor.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in beam of the above disclosure.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:

a waveguide configured to guide an image light to propagate from a light inputting surface to a light outputting surface, wherein the waveguide includes a substrate having a back surface facing an eye-box region of the device and a front surface opposite to the back surface, a plurality of out-coupling structures disposed at the back surface or at least partially inside the substrate, and a medium layer embedded inside the substrate between the out-coupling structures and the front surface, and wherein the substrate includes a plurality of supporting structures that are protrusions from the back surface of the substrate, and the plurality of out-coupling structures are formed at predetermined surfaces of the supporting structures, wherein the medium layer has a refractive index that is lower than the substrate; and an optical lens printed over the back surface of the substrate.

2. The device of claim 1, wherein the medium layer has a first side facing the eye-box region and a second side opposite to the first side, the image light is totally internally reflected at the first side of the medium layer, and is not totally internally reflected at the back surface of the substrate.

3. The device of claim 1, wherein the optical lens is a prescription lens.

4. The device of claim 1, wherein the substrate and the optical lens includes different materials having substantially close refractive indices.

5. The device of claim 1, wherein the optical lens is in direct contact with the out-coupling structures.

6. The device of claim 1, wherein the out-coupling structures are embedded inside the substrate.

7. The device of claim 1, wherein the waveguide and the optical lens are integrally formed as a single piece through three-dimensional ("3D") printing, and the substrate and the optical lens are 3D printed based on different materials having substantially close refractive indices.

8. The device of claim 1, further comprising a folding structure embedded inside the substrate, between the medium layer and the back surface.

9. The device of claim 8, wherein:

the medium layer has a first side facing the eye-box region and a second side opposite to the first side, the medium layer is configured to totally internally reflect the image light entering the waveguide through the light inputting surface at the first side toward the folding structure, the folding structure is configured to reflect the image light received from the first side of the medium layer back to the first side of the medium layer, the medium layer is configured to totally internally reflect the image light received from the folding structure again at the first side toward the out-coupling structures, and the out-coupling structures are configured to couple the image light out of the waveguide as a plurality of output image lights toward the optical lens.

10. The device of claim 8, wherein the out-coupling structures are flat reflectors, and the folding structure is a curved reflector.

11. The device of claim 1, wherein the medium layer is a cavity filled with air.

12. The device of claim 1, wherein the plurality of out-coupling structures are arranged in parallel on the predetermined surfaces of the supporting structures.

13. A method, comprising:

providing a waveguide including a substrate having a back surface and a front surface opposite to the back surface, a plurality of out-coupling structures disposed at the back surface or at least partially inside the substrate, and a medium layer embedded inside the substrate between the out-coupling structures and the front surface, the medium layer having a refractive index that is lower than the substrate, wherein the substrate includes a plurality of supporting structures that are protrusions from the back surface of the substrate, and the plurality of out-coupling structures are formed at predetermined surfaces of the supporting structures; and printing an optical lens over the back surface of the substrate.

14. The method of claim 13, wherein providing the substrate having the plurality of supporting structures at the back surface of the substrate comprises:

3D printing the substrate having the plurality of supporting structures at the back surface of the substrate, and while 3D printing the substrate, 3D printing the supporting structures as protrusions from the back surface of the substrate.

15. The method of claim 13, forming the plurality of out-coupling structures over the predetermined surfaces of the supporting structures comprises depositing metals over the predetermined surfaces of the supporting structures to form the out-coupling structures as reflectors.

16. The method of claim 14, wherein the medium layer is a cavity filled air, and providing the substrate having the plurality of supporting structures at the back surface of the substrate further comprises:

3D printing surrounding pillars and a cover plate to form the cavity when 3D printing the substrate.

17. The method of claim 16, wherein printing the optical lens over the back surface of the substrate comprises:

3D printing the optical lens on the back surface of the substrate to cover the out-coupling structures, with a prescription lens being in direct contact with the out-coupling structures.

18. The method of claim 13, wherein providing the waveguide comprises 3D printing the waveguide using a first material with a first refractive index, and printing the optical lens over the back surface of the substrate comprises 3D printing the optical lens over the waveguide using a second material with a second refractive index that is substantially close to the first refractive index, such that the waveguide and the optical lens are integrally 3D printed as a single piece.

19. The method of claim 13, further comprising forming a folding structure embedded inside the substrate, between the medium layer and the back surface.

20. The method of claim 13, wherein the plurality of out-coupling structures are arranged in parallel along the predetermined surfaces of the supporting structures.

* * * * *